(12) United States Patent
Kawamura et al.

(10) Patent No.: US 11,891,122 B2
(45) Date of Patent: Feb. 6, 2024

(54) FRAME WHICH IS MADE OF FIBER REINFORCED COMPOSITE

(71) Applicants: MAZDA MOTOR CORPORATION, Hiroshima (JP); NIPPON STEEL Chemical & Material Co., Ltd., Tokyo (JP)

(72) Inventors: Chikara Kawamura, Hiroshima (JP); Tetsuya Sugiyama, Tokyo (JP)

(73) Assignees: MAZDA MOTOR CORPORATION, Hiroshima (JP); NIPPON STEEL Chemical & Material Co., Ltd., Tokyo (JP)

( * ) Notice: Subject to any disclaimer, the term of this patent is extended or adjusted under 35 U.S.C. 154(b) by 113 days.

(21) Appl. No.: 17/569,087

(22) Filed: Jan. 5, 2022

(65) Prior Publication Data
US 2022/0297769 A1    Sep. 22, 2022

(30) Foreign Application Priority Data

Mar. 19, 2021   (JP) ................. 2021-045402

(51) Int. Cl.
| | |
|---|---|
| *B62D 29/04* | (2006.01) |
| *B62D 25/02* | (2006.01) |
| *B60R 19/18* | (2006.01) |
| *B62D 25/04* | (2006.01) |
| *B62D 21/15* | (2006.01) |

(52) U.S. Cl.
CPC ............ *B62D 29/043* (2013.01); *B60R 19/18* (2013.01); *B62D 25/025* (2013.01); *B62D 25/04* (2013.01); *B60R 2019/1853* (2013.01); *B62D 21/152* (2013.01)

(58) Field of Classification Search
CPC .... B62D 29/043; B62D 25/025; B62D 25/04; B62D 21/152; B60R 19/18; B60R 2019/1853
See application file for complete search history.

(56) References Cited

FOREIGN PATENT DOCUMENTS

| | | | |
|---|---|---|---|
| JP | 2007009028 A | * | 1/2007 |
| JP | 2015-193362 A | | 11/2015 |

OTHER PUBLICATIONS

Computer translation for JP-2007009028-A (Year: 2007).*

* cited by examiner

*Primary Examiner* — Amy R Weisberg
*Assistant Examiner* — Melissa Ann Bonifazi
(74) *Attorney, Agent, or Firm* — Studebaker & Brackett PC

(57) ABSTRACT

Provided is a frame which is made of a fiber reinforced composite and has an increased bending strength by suppressing occurrence of buckling. The frame which is made of a fiber reinforced composite includes: a compressive wall part where a compressive stress occurs in a longitudinal direction of the frame when the frame receives a bending load in a normal direction perpendicularly intersecting the longitudinal direction; and a side wall part extending in the normal direction and defining one of corners with the compressive wall part. The compressive wall part includes a longitudinal alignment layer having reinforcement fibers aligned in the longitudinal direction. The side wall part has a surface section composed of a normal directional alignment layer having reinforcement fibers aligned in a direction different from the longitudinal direction, and serving as a differential alignment layer.

16 Claims, 26 Drawing Sheets

US 11,891,122 B2

FRAME WHICH IS MADE OF FIBER REINFORCED COMPOSITE

FIELD OF THE INVENTION

The present invention relates to a frame which is made of a fiber reinforced composite.

BACKGROUND ART

A frame which is made of a fiber reinforced composite and has a light weight and high stiffness has been conventionally adopted as a frame forming a body of a vehicle.

For instance, Japanese Unexamined Patent Publication No. 2015-193362 discloses a frame which is made of a fiber reinforced composite with a configuration having such quasi-isotropic properties as to withstand a load input from every direction, specifically, with a configuration including a plurality of fiber alignment layers lying on one another and each having reinforcement fibers aligned in different directions from each other.

Besides, the frame has an enclosed cross-section defining a corner having a partly larger thickness with an increased number of fiber alignment layers at the corner to improve the stiffness of the corner of the frame.

However, even the frame with the configuration including the increased number of fiber alignment layers at the corner has a difficulty in preventing a problem peculiar to the frame which is made of a fiber reinforced composite, such as buckling attributed to layer separation which may occur at the corner.

Specifically, when the frame which is made of a fiber reinforced composite receives a bending load input thereto, the layer separation may occur between the fiber alignment layers at the corner defined by a frame cross-section. The layer separation occurring in a specific section of the corner extends therefrom to a wall part of the frame (i.e., an inner curving wall part of the bent frame) where a compressive stress occurs and a wall part adjacent thereto, which causes a crack in the fiber alignment layers in each of the wall parts. As a result, buckling of the frame occurs. The occurrence of buckling of the frame leads to a serious decrease in a bending strength. From these perspectives, the frame disclosed in Japanese Unexamined Patent Publication No. 2015-193362 cannot prevent the occurrence of such event.

SUMMARY OF THE INVENTION

It is an object of the present invention to provide a frame which is made of a fiber reinforced composite and has an increased bending strength by suppressing occurrence of buckling.

A frame which is made of a fiber reinforced composite according to the present invention has an enclosed cross-section defining a plurality of corners, and has a predetermined length. The frame includes: a compressive wall part where a compressive stress occurs in a longitudinal direction of the frame when the frame receives a bending load in a normal direction perpendicularly intersecting the longitudinal direction; and a side wall part extending in the normal direction and defining one of the corners with the compressive wall part. The compressive wall part includes a longitudinal alignment layer having reinforcement fibers aligned in the longitudinal direction. The side wall part has a surface section composed of a differential alignment layer having reinforcement fibers aligned in a direction different from the longitudinal direction.

DESCRIPTION OF EMBODIMENTS

Hereinafter, a preferable embodiment of the present invention will be described in detail with reference to the accompanying drawings.

Figure 1:
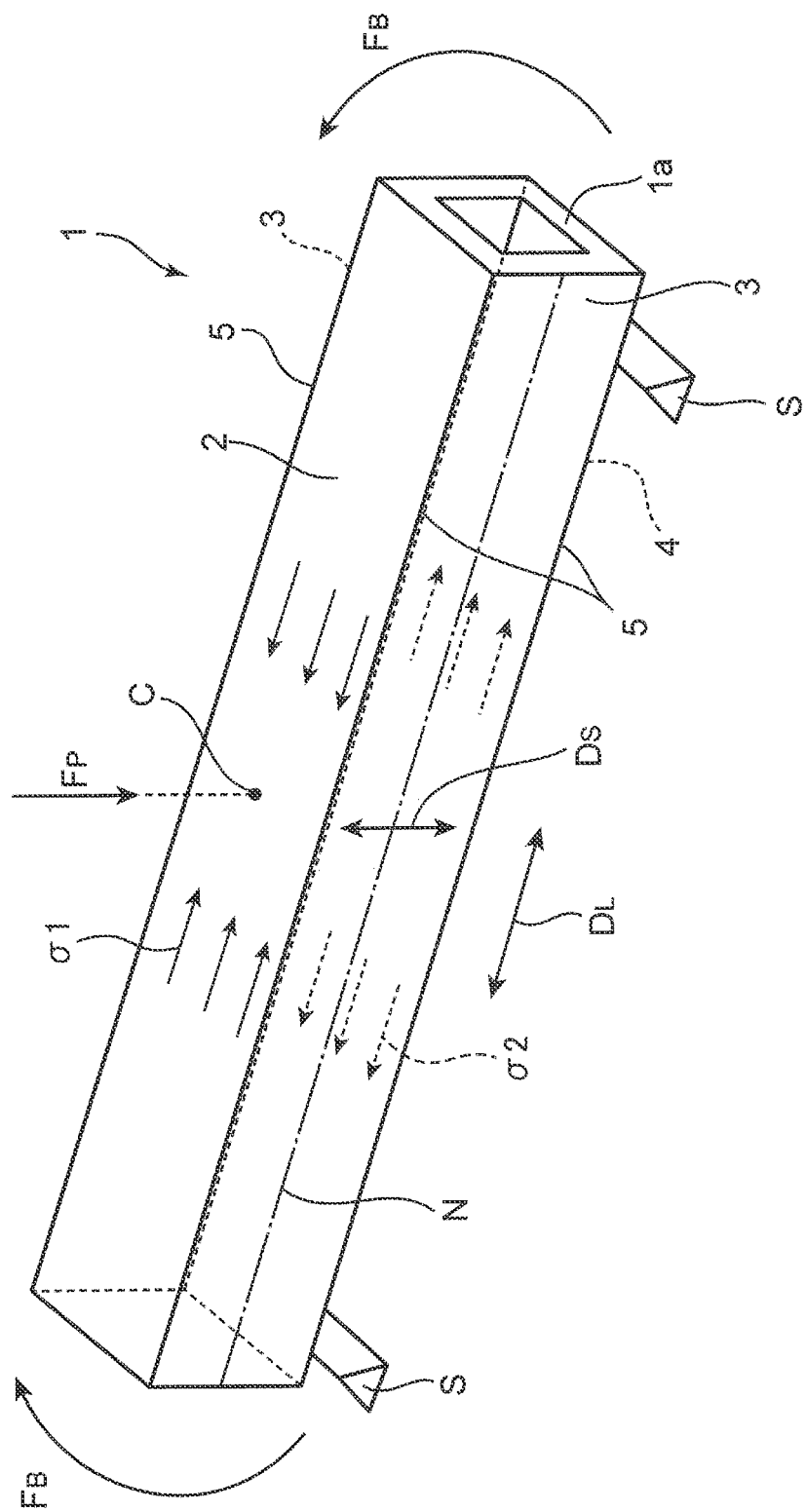
FIG. 1 is a schematic perspective view illustrating an overall configuration of a frame which is made of a fiber reinforced composite according to an embodiment of the present invention.
Figure 2:
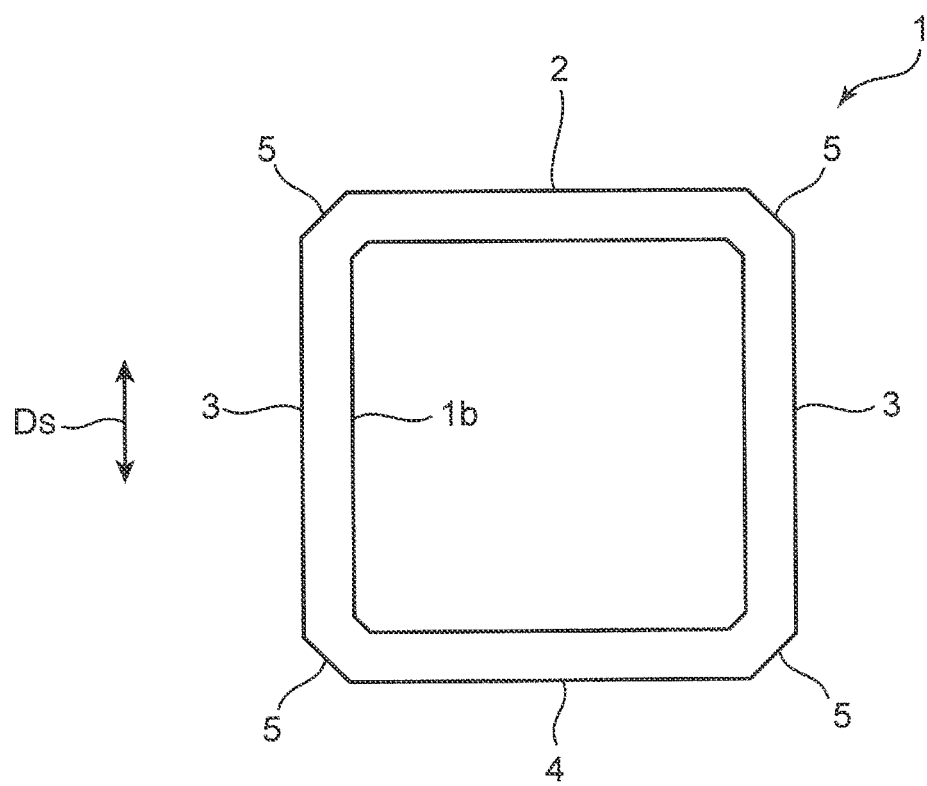
FIG. 2 is a front view of an end surface of the frame which is made of a fiber reinforced composite shown in FIG. 1.

As shown in FIGS. 1 to 2, a frame which is made of a fiber reinforced composite 1 (hereinafter, referred to as "frame 1") is a member having a high strength, having an enclosed cross-section 1$b$ defining a plurality of corners 5, and having a predetermined length (in a longitudinal direction $D_L$ shown in FIG. 1). The frame 1 is applied to a member constituting each part of a body 21 (see FIG. 6) of a vehicle to be described later.

Specifically, the frame 1 includes, as a basic configuration, four wall parts extending in the longitudinal direction $D_L$ of the frame 1 and defining four surfaces thereof, i.e., a compressive wall part 2, a pair of side wall parts 3 spaced from each other oppositely in a width direction of the compressive wall part 2, and a tension wall part 4 which is away from the compressive wall part 2 while facing the compressive wall part 2.

Figure 3:
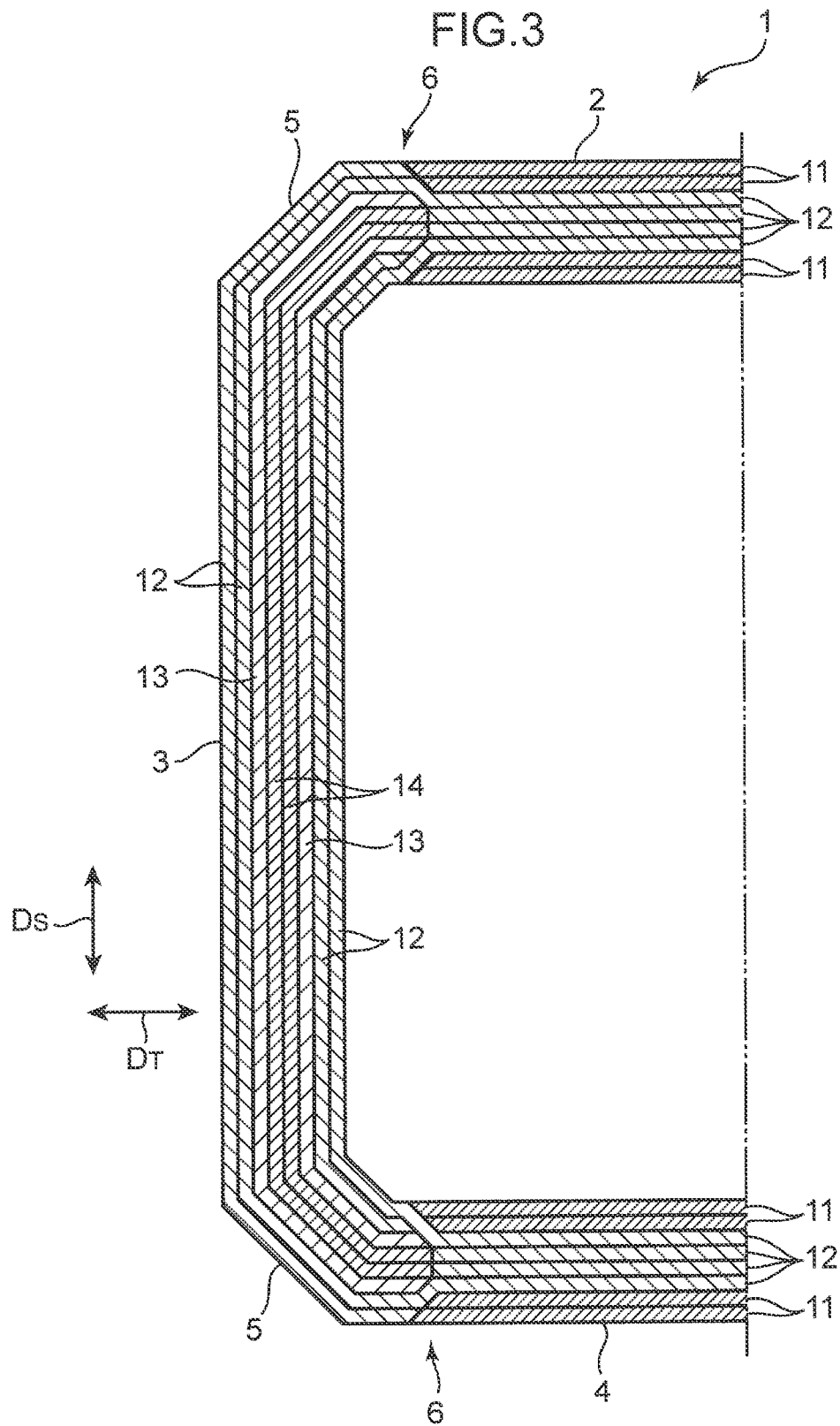
FIG. 3 is an enlarged cross-sectional view of the frame which is made of a fiber reinforced composite shown in FIG. 2.

Each of the compressive wall part 2, the pair of side wall parts 3, and the tension wall part 4 includes a plurality of fiber alignment layers (such as a longitudinal alignment layer 11, a normal directional alignment layer 12, a +45-degree alignment layer 13, and a −45-degree alignment layer 14 as shown in FIG. 3) lying on one another to be integrated. The compressive wall part 2, the pair of side wall parts 3, and the tension wall part 4 form an enclosed cross-section 1$b$ defining four corners 5. Each of the corners 5 may be chamfered into a linear or arch shape.

The compressive wall part 2 is a part where a compressive stress σ1 occurs in the longitudinal direction $D_L$ of the frame 1 when the frame 1 receives a bending load $F_B$ for bending the frame 1 in a normal direction $D_S$ perpendicularly intersecting the longitudinal direction $D_L$ (at an angle of 90 degrees to the longitudinal direction $D_L$). In other words, the compressive wall part 2 results in an inner curving part of the bent frame 1. Here, the normal direction $D_S$ represents a direction perpendicularly intersecting the longitudinal direction $D_L$ of the frame 1, specifically, corresponds to a circumferential direction of the frame 1 which has the predetermined length and a quadrangular tube-like shape, as shown in FIG. 1, the direction crossing the compressive wall part 2, the side wall parts 3, or the tension wall part 4 while perpendicularly intersecting the longitudinal direction $D_L$.

Figure 11:
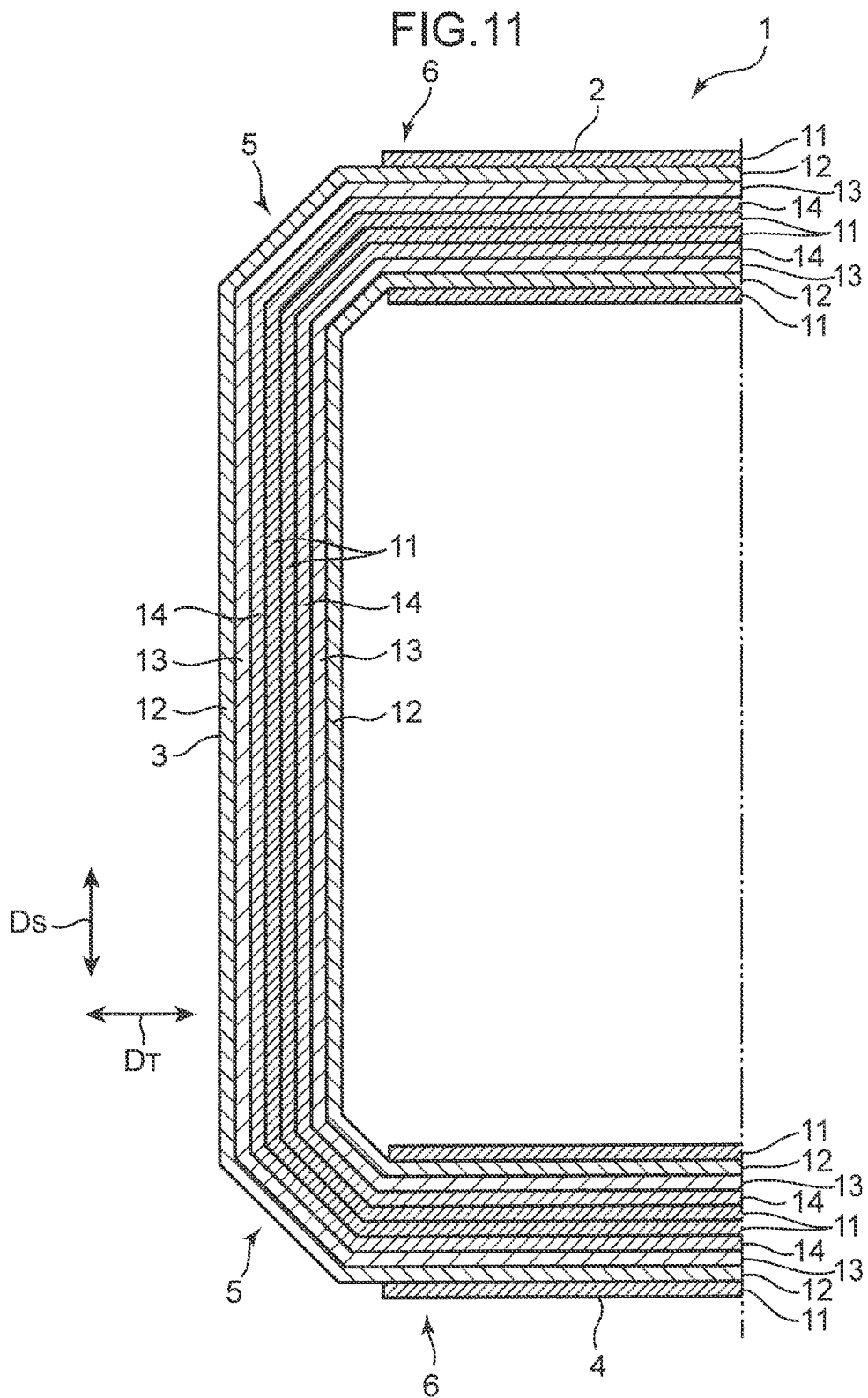
FIG. 11 is an enlarged cross-sectional view of a frame which is made of a fiber reinforced composite according to further still another modification of the present invention.

Here, the bending load $F_B$ is enough to work as a load for bending the frame 1 in the normal direction $D_S$ perpendicularly intersecting the longitudinal direction $D_L$ of the frame 1. For instance, the bending load is prospected to occur when the compressive wall part 2 receives a compressive load (impact load) $F_P$ in the normal direction $D_S$, that is, a normal direction of the compressive wall part 2 in FIG. 1, in a state where both ends of the frame 1 are supported as shown in FIG. 11 (e.g., in a state where the two opposite ends of the frame 1 are supported at a pair of fulcrums S in the simplified model shown in FIG. 1) at a collision of the body 21 of the vehicle (see FIG. 6) with an obstacle (other vehicle or an object provided on a road) located outside. In this case, the compressive wall part 2 of the frame 1 receives the compressive load $F_P$.

Figure 6:
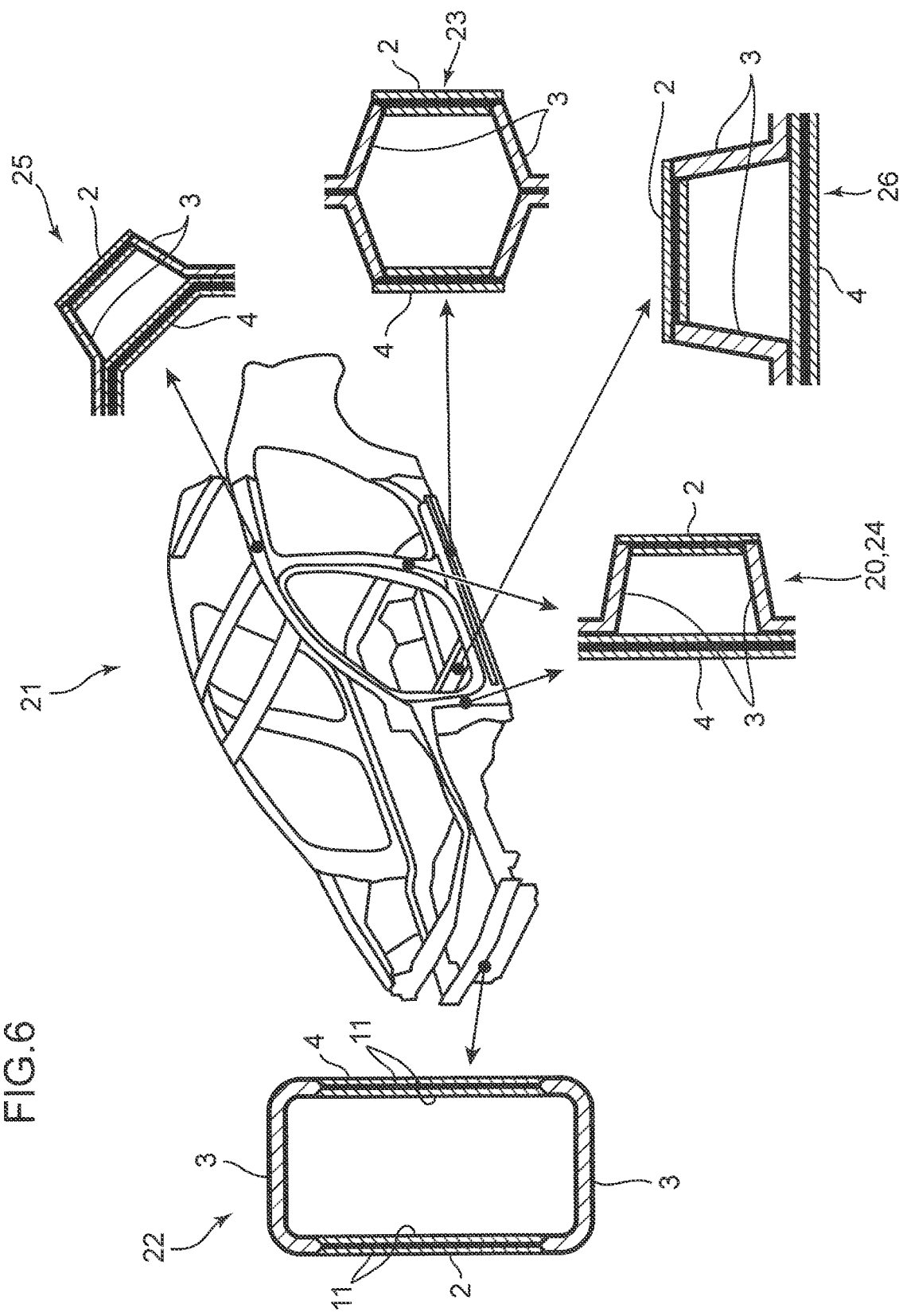
FIG. 6 is a perspective explanatory view showing an example where the frame which is made of a fiber reinforced composite as shown in FIG. 1 constitutes a structural member of each part of a body of a vehicle.

Alternatively, the bending load $F_B$ is prospected to occur when the frame 1 receives a compressive load (impact load) in the longitudinal direction $D_L$ from an end part 1$a$ of the frame 1 in the longitudinal direction $D_L$ thereof, like a bending load of a crossmember 26 which occurs at a collision of a side part of the body 21 of the vehicle shown in FIG. 6 with an obstacle. In this case, the end part 1$a$ of the frame 1 receives the compressive load.

Each of the side wall parts 3 extends in the normal direction $D_S$ and defining a pair of corners 5 with the compressive wall part 2 (specifically, extends in a direction parallel to a direction in which the bending load $F_B$ occurs or a direction in which the compressive load $F_P$ occurs). The side wall part 3 has a region closer to the compressive wall part 2 than a neutral axis N in FIG. 1 where the compressive stress occurs and another region closer to the tension wall part 4 than the neutral axis N where the tensile stress occurs when the frame 1 receives the bending load $F_B$. Each of the side wall parts 3 and the compressive wall part 2 define a corresponding one of the corners 5.

The tension wall part 4 is a part which is away from the compressive wall part 2 and extends in the longitudinal direction $D_L$, and where a tensile stress σ2 occurs in the longitudinal direction $D_L$ when the frame 1 receives the bending load $F_B$. In other words, the tension wall part 4 results in an outer curving part of the bent frame 1. The tension wall part 4 and each of the side wall parts 3 define a corresponding one of the corners 5.

Figure 4:
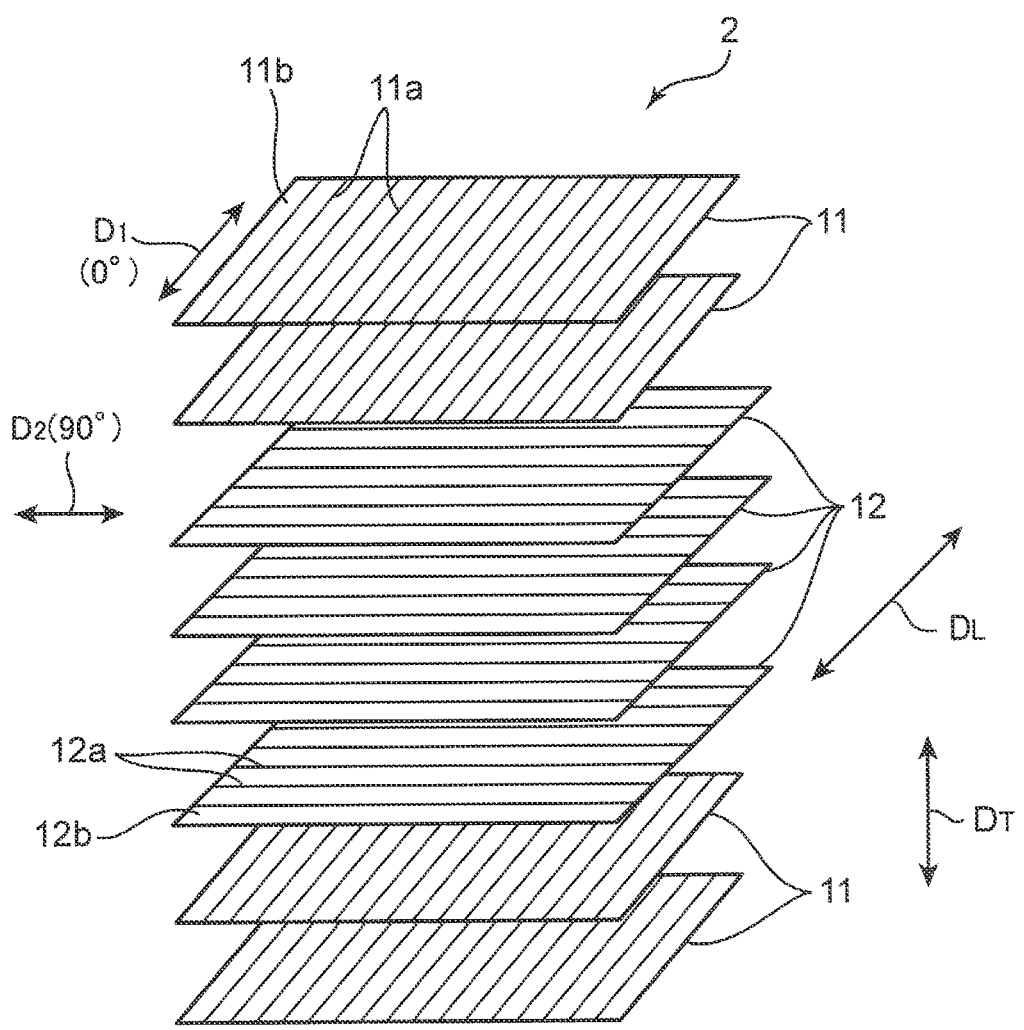
FIG. 4 is an exploded perspective view showing a part of a laminate structure of a compressive wall part shown in FIG. 3.

As shown in FIGS. 3 to 4, the compressive wall part 2 in the embodiment includes a longitudinal alignment layer 11 having reinforcement fibers 11$a$ aligned in the longitudinal direction $D_L$. Specifically, the compressive wall part 2 shown in FIGS. 3 to 4 includes two longitudinal alignment layers 11, four normal directional alignment layers 12, and two longitudinal alignment layer 11 lying on one another in a thickness direction $D_T$ of the frame in the cross-section thereof. The compressive wall part 2 has a laminate structure being symmetric in the thickness direction $D_T$.

Specifically, the longitudinal alignment layer 11 has a base 11b and reinforcement fibers 11a aligned in a direction $D_1$ corresponding to the longitudinal direction $D_L$ of the frame 1 (at an angle of 0 degree to the longitudinal direction $D_L$) as shown in FIG. 4.

The base 11b (as well as 12b, 13b, 14b) is aimed at a sheet-like base composed of the reinforcement fibers 11a (as well as 12a, 13a, 14a) and a resin for use in autoclave molding or press molding, a base having the reinforcement fibers 11a which are temporarily fixed thereto for use in RTM molding, and the like. The base 11b is made of resin material being excellent in heat resistance, strength, and workability, e.g., a resin, such as an epoxy resin. The reinforcement fibers 11a are made of fiber material having a light weight and a high strength, e.g., carbon fibers, glass fibers, aramid fibers, cellulose fibers, and steel fibers. Particularly, the carbon fibers are preferable in view of excellence in both the light weight and high strength.

Specifically, the normal directional alignment layer 12 has the base 12b and the reinforcement fibers 12a aligned in the normal direction $D_S$ of the frame 1, i.e., a direction $D_2$ perpendicularly intersecting the longitudinal direction $D_L$ (at a tilt angle of 90 degrees) as shown in FIG. 4. The same materials as those respectively used for the base 11b and the reinforcement fibers 11a of the longitudinal alignment layer 11 are used for the base 12b and the reinforcement fibers 12a of the normal directional alignment layer 12 as well, but different materials may be used.

Figure 5:
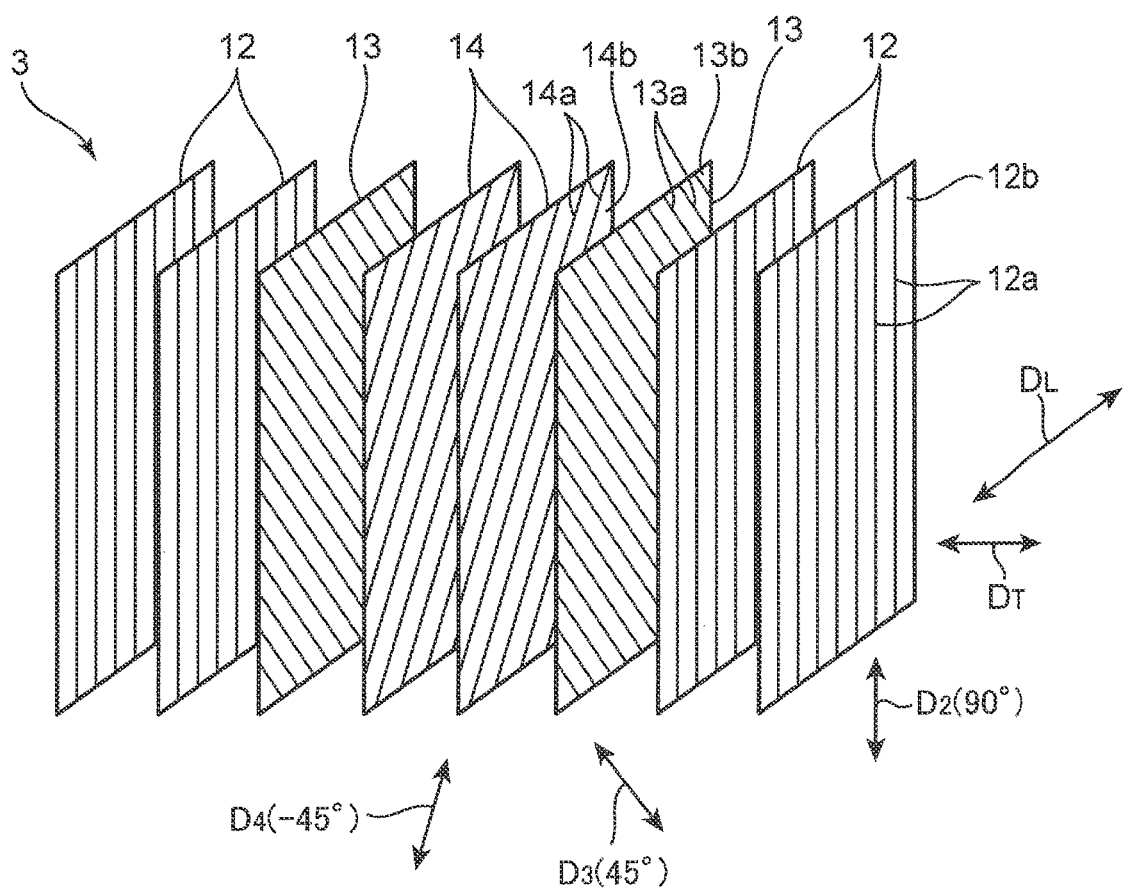
FIG. 5 is an exploded perspective view showing a part of a laminate structure of a side wall part shown in FIG. 3.

The side wall part 3 shown in FIG. 3 and FIG. 5 has a surface section composed of a differential alignment layer having reinforcement fibers aligned in a direction different from the longitudinal direction $D_L$. Here, the term "surface section" of the side wall part 3 covers each of an inner surface section and an outer surface section of the frame 1 in the cross-section thereof.

The differential alignment layer may be sufficient to serve as a layer having reinforcement fibers aligned in a direction different from the longitudinal direction $D_L$. In this respect, the differential alignment layer may be, specifically, the normal directional alignment layer 12 having reinforcement fibers aligned in the normal direction $D_S$ or a 45-degree alignment layer (such as the +45-degree alignment layer 13 and the −45-degree alignment layer 14, which will be described later) having reinforcement fibers aligned in a direction at an angle of 45 degrees to the longitudinal direction $D_L$.

As shown in FIG. 5, the normal directional alignment layer 12 has the base 12b and the reinforcement fibers 12a aligned in the normal direction $D_S$ of the frame 1 in the same manner as other layers described above.

The 45-degree alignment layer may be sufficient to serve as a layer having reinforcement fibers aligned in a direction at an angle of 45 degrees to the longitudinal direction $D_L$, and thus may be either of the +45-degree alignment layer 13 at an angle of +45 degrees to the longitudinal direction $D_L$ or the −45-degree alignment layer 14 at an angle of −45 degrees to the longitudinal direction $D_L$, as shown in FIG. 5.

For instance, the +45-degree alignment layer 13 has the reinforcement fibers 13a aligned in a direction at a clockwise rotation angle of 45 degrees in an in-plane direction of the alignment layer 13 with respect to the longitudinal direction $D_L$. Similarly, the −45-degree alignment layer 14 has the reinforcement fibers 14a aligned in a direction at a counterclockwise rotation angle of 45 degrees (−45 degrees when the clockwise direction is defined as a positive direction) in an in-plane direction of the alignment layer 14 with respect to the longitudinal direction $D_L$.

Specifically, the side wall part 3 shown in FIG. 3 and FIG. 5 includes two normal directional alignment layers 12, one +45-degree alignment layer 13, two −45-degree alignment layers 14, one +45-degree alignment layer 13, and two normal directional alignment layers 12 lying on one another in the thickness direction $D_T$ of the frame 1 in the cross-section thereof. The side wall part 3 has a laminate structure being symmetric in the thickness direction $D_T$.

Specifically, the +45-degree alignment layer 13 has the base 13b and the reinforcement fibers 13a aligned in a direction $D_3$ at an angle of +45 degrees to the longitudinal direction $D_L$ as shown in FIG. 5. Similarly, the −45-degree alignment layer 14 includes, specifically, the base 14b and the reinforcement fibers 14a aligned in a direction $D_4$ at an angle of −45 degrees to the longitudinal direction $D_L$ as shown in FIG. 5. The same materials as those respectively used for the base 11b and the reinforcement fibers 11a of the longitudinal alignment layer 11 are used for the bases 13b, 14b and the reinforcement fibers 13a, 14a as well, but different materials may be used.

The tension wall part 4 shown in FIG. 3 includes a longitudinal alignment layer 11 in the same manner as the compressive wall part 2. Specifically, the tension wall part 4 shown in FIG. 3 has the same laminate structure as the compressive wall part 2, that is, includes two longitudinal alignment layers 11, four normal directional alignment layers 12, and two longitudinal alignment layers 11 lying on one another in the thickness direction $D_T$ of the frame 1 in the cross-section thereof. That is to say, the tension wall part 4 has the laminate structure being symmetric in the thickness direction $D_T$ like the laminate structure of the compressive wall part 2.

As shown in FIG. 3, in the embodiment, a connection section 6 where layers constituting the compressive wall part 2 are connected to layers constituting the side wall part 3 lies in the compressive wall part 2, and a connection section 6 where layers constituting the tension wall part 4 are connected to layers constituting the side wall part 3 lies in the tension wall part 4. Specifically, each of the compressive wall part 2 and the tension wall part 4 includes four longitudinal alignment layers 11 and four normal directional alignment layers 12 as shown in FIG. 3. Besides, the layers constituting the side wall part 3 include four normal directional alignment layers 12, two +45-degree alignment layers 13, and two −45-degree alignment layers 14.

The term "connection section 6" means a section where adjacent different layers are connected to each other. The connection section 6 covers various kinds of connection sections, e.g., a connection section where two adjacent layers are connected to each other in a state of partly lying on each other, and a connection section where two adjacent layers are connected to each other in a state where respective ends of the layers are in contact with each other.

Further, as shown in FIG. 3, the longitudinal alignment layer 11 in each of the compressive wall part 2 and the tension wall part 4 is out of the corners 5.

Moreover, the longitudinal alignment layers 11 lie in an inner surface section (on an inner periphery of the enclosed cross-section 1b of the frame 1) and/or an outer surface section (on an outer periphery of the frame 1) each of the compressive wall part 2 and the tension wall part 4.

Additionally, as shown in FIG. 3, the normal directional alignment layer 12 of the compressive wall part 2 and the normal directional alignment layer 12 of the side wall part 3 are continuous from the compressive wall part 2 to the side wall part 3. In other words, the normal directional alignment layers 12 extend over the entire periphery (i.e., the compressive wall part 2, the pair of side wall part 3, and the tension wall part 4) of the frame 1 in the normal direction $D_S$ thereof. Each of the normal directional alignment layers 12 extending over the entire periphery of the frame 1 preferably has a cut (or a connection section connecting end edges of the layers to each other) in the tension wall part 4 which hardly receives an influence of the compressive load (impact load) $F_P$ shown in FIG. 1.

The frame 1 having the above-described configuration according to the embodiment is applicable to various members forming the body 21 of the vehicle and required to have a high bending strength in preparation for a possible vehicle collision, e.g., constitutes at least one selected from the group consisting of a center pillar 20, a bumper beam 22, a side sill 23, a hinge pillar 24, a front pillar 25, and the crossmember 26, as shown in FIG. 6.

In a case where the frame according to the embodiment constitutes each of the center pillar 20, the bumper beam 22, the side sill 23, the hinge pillar 24, and the front pillar 25 selected from the group, the compressive wall part 2 may be located to face outward from the body 21 (i.e., to receive the impact load). In a case where the frame constitutes the crossmember 26, the compressive wall part 2 may be located to face upward or downward.

Here, the center pillar 20 is a member extending in an up-down direction between a front door and a rear door at a side end of the body 21. The bumper beam 22 is a member extending in a width direction of the body 21 at a front end of the body 21 and constituting a bumper. The side sill 23 is a member extending in a front-rear direction of the body 21 at a side lower end of the body 21. The hinge pillar 24 is a member extending in the up-down direction at a side front end of the body 21 for hinging the front door thereto in the body 21. The front pillar 25 is a member extending upward and rearward (diagonally rearward) in a substantially are shape at the opposite side-positions of a windshield at the front of the body 21. The crossmember 26 is a member extending in the width direction of the body 21 at the bottom of the body 21.

Features of Embodiment (1)
The frame 1 according to the embodiment is a frame which is made of a fiber reinforced composite 1, has the enclosed cross-section 1b defining the plurality of corners 5, and has a predetermined length. As shown in FIG. 1, the frame 1 includes: the compressive wall part 2 where a compressive stress σ1 occurs in the longitudinal direction $D_L$ of the frame 1 when the frame 1 receives a bending load FR for bending the frame 1 in the normal direction $D_S$ perpendicularly intersecting the longitudinal direction $D_L$; and the side wall part 3 extending in the normal direction $D_S$ and defining one of the corners 5 with the compressive wall part 2.

As shown in FIGS. 3 to 5, the compressive wall part 2 includes the longitudinal alignment layer 11 having reinforcement fibers aligned in the longitudinal direction $D_L$. The side wall part 3 has a surface section (which covers each of the inner surface section and the outer surface section of the frame 1) composed of the normal directional alignment layer 12 having the reinforcement fibers aligned in a direction different from the longitudinal direction $D_L$, and serving as a differential alignment layer.

In this configuration, the compressive stress σ1 occurs in the compressive wall part 2 in the longitudinal direction $D_L$ of the frame 1 when the frame 1 receives the bending load $F_B$ for bending the frame 1 in a direction perpendicularly intersecting the longitudinal direction $D_L$ thereof. The compressive wall part 2 including the longitudinal alignment layer 11 extending in the longitudinal direction $D_L$ of the frame 1 can withstand the compressive stress σ1 even at a high value, and the compressive wall part 2 further can have an increased buckling strength. The bending stiffness is improvable as well. Further, the side wall part 3 has the surface section composed of the normal directional alignment layer 12 having the reinforcement fibers aligned in a direction different from the longitudinal direction $D_L$ (e.g., in the normal direction $D_S$ of the frame 1 or in a diagonal direction at a specific angle to the longitudinal direction $D_S$ of the frame 1, in the side wall part 3), and serving as the differential alignment layer. The side wall part 3 having this configuration can withstand a high shear stress and a high bending stress, and deformation (particularly, buckling deformation) of the side wall part 3 is suppressible. This configuration can prevent a crack attributed to occurrence of layer separation at the corner 5 of the frame 1 from extending to the compressive wall part 2 and the side wall part 3, and accordingly can enhance a buckling resistance of the frame 1. As a result, the frame 1 can have an increased bending strength by avoiding buckling of the entirety of the frame 1.

(2)
In the frame 1 according to the embodiment, the differential alignment layer composing the surface section of the side wall part 3 includes the normal directional alignment layer 12 having the reinforcement fibers aligned in the normal direction $D_S$ of the frame 1. Therefore, the stiffness (e.g., the bending stiffness against a load applied in a specific direction for causing deformation in the normal direction $D_S$) of the side wall part 3 in the normal direction $D_S$ is improvable.

(3)
In the frame 1 according to the embodiment, the differential alignment layer composing the surface section of the side wall part 3 may include a 45-differential alignment layer (such as the +45-degree alignment layer 13 and the −45-degree alignment layer 14) having reinforcement fibers aligned in a direction at an angle of 45 degrees to the longitudinal direction $D_L$. This configuration can improve the shear stiffness of the side wall part 3 as well.

(4)
As shown in FIG. 3, the frame 1 according to the embodiment further includes the tension wall part 4 which is away from the compressive wall part 2 and extends in the longitudinal direction $D_L$, and where a tensile stress σ2 occurs in the longitudinal direction $D_L$ when the frame 1 receives the bending load FR. The tension wall part 4 includes the longitudinal alignment layer 11.

In this configuration, the tensile stress σ2 occurs in the tension wall part 4, which is away from the compressive wall part 2 in the normal direction $D_S$ of the frame 1, in the longitudinal direction $D_L$ of the frame 1 when the frame 1 receives the bending load $F_B$. The tension wall part 4 including the longitudinal alignment layer 11 can have an increased tensile strength. As a result, the bending strength of the frame 1 can have a further increased bending strength by effectively avoiding the buckling of the entirety of the frame 1.

As shown in FIG. 3, in the frame 1 according to the embodiment, the connection section 6 where layers constituting the compressive wall part 2 are connected to layers constituting the side wall part 3 lies in the compressive wall part 2, and/or the connection section 6 where layers constituting the tension wall part 4 are connected to layers constituting the side wall part 3 lies in the tension wall part 4.

In this configuration, the connection section 6 where the layers constituting the compressive wall part 2 are connected to layers constituting the side wall part 3 lies in the compressive wall part 2, and/or the connection section 6 where the layers constituting the tension wall part 4 are connected to layers constituting the side wall part 3 lies in the tension wall part 4, the connection sections being away from the corresponding corners 5 of the frame 1. Consequently, buckling starting from the connection section 6 is suppressible at each corner 5.

(6)

As shown in FIG. 3, the longitudinal alignment layer 11 in the frame 1 according to the embodiment is out of the corners 5. This arrangement can minimize possible damage caused by layer separation which occurs at the corner 5 and a crack attributed thereto, resulting in further successful suppression of the buckling at the corner 5.

(7)

As shown in FIG. 3, in the frame 1 according to the embodiment, the longitudinal alignment layer 11 lies in the inner surface section and/or the outer surface section of the compressive wall part 2. In the embodiment, the longitudinal alignment layers 11 lies in the inner surface section and the outer surface section each of the compressive wall part 2 and the tension wall part 4.

When the frame 1 receives the bending load FR, the compressive stress σ1 becomes the largest in the inner surface section and the outer surface section of the compressive wall part 2, and distortion in the compressive wall part 2 reaches a maximum. The longitudinal alignment layer 11 lying in the inner surface section and/or the outer surface section of the compressive wall part 2 can withstand a much higher compressive stress σ1 and have an increased buckling strength owing to the arrangement in this configuration. The bending stiffness is improvable as well.

(8)

As shown in FIG. 3, in the frame 1 according to the embodiment, the normal directional alignment layer 12 of the compressive wall part 2 and the normal directional alignment layer 12 of the side wall part 3 are continuous from the compressive wall part 2 to the side wall part 3. This configuration can suppress such deformation that the entire periphery of the frame 1 in the cross-section thereof is deformed in the normal direction $D_S$, and accordingly can further increase the bending strength of the frame 1.

(9)

The frame 1 according to the embodiment constitutes at least one selected from the group consisting of the center pillar 20, the bumper beam 22, the side sill 23, the hinge pillar 24, the front pillar 25, and the crossmember 26 forming the body 21 of the vehicle. Accordingly, the frame 1 can withstand the bending load $F_B$ by avoiding the buckling of the entirety of the frame 1 when the frame 1 constituting each member forming the body 21 receives the bending load $F_B$ at a vehicle collision. Consequently, the stiffness of the body 21 is improvable.

(10)

As shown in FIGS. 1 to 5, the compressive wall part 2 in the frame 1 according to the embodiment further includes the normal directional alignment layer 12 having the reinforcement fibers aligned in the normal direction $D_S$ in addition to the longitudinal alignment layer 11. The longitudinal alignment layer 11 is located closer to the surface of the compressive wall part 2 than the normal directional alignment layer 12. In this configuration, the longitudinal alignment layer 11 may be located only in the surface section, or in each of the surface section and the center section of the compressive wall part 2.

When the frame 1 receives the bending load $F_B$, the compressive stress σ1 tends to be larger at a position closer to the surface of the compressive wall part 2. In this configuration of the frame 1 according to the embodiment, the compressive wall part 2 including the longitudinal alignment layer 11 located closer to the surface of the compressive wall part 2 than the normal directional alignment layer 12 can withstand a much higher compressive stress σ1 owing to this arrangement. Consequently, the compressive wall part 2 can have an increased buckling strength. The bending stiffness is improvable as well.

Example 1

Next, the bending strength of the frame 1 according to the embodiment shown in FIGS. 1 to 5 will be described in comparison with the bending strength of the frame according to each of comparative examples.

The frame 1 according to the embodiment has a square cross-section with a side length of 50 mm, and each of the corners 5 has a chamfer in an arch shape having a radius of 10 mm. Each wall part in the frame 1 has a thickness of 3.4 mm.

In a check of the bending strength, an indenter was brought into contact with a center C of the compressive wall part 2 in the longitudinal direction $D_L$ and displaced downward in a state where both ends of the frame 1 were respectively supported at the two fulcrums S (at an interval of 300 mm therebetween) shown in FIG. 1 to bend the frame 1 thereby gradually in accordance with a series of procedures of a general bending test. In this manner, a relation between a downward displacement X of the indenter and a bending load P (i.e., a counterforce which the indenter receives from the frame 1) of the frame 1 was investigated as shown by a curve I in a graph in FIG. 19.

Figure 17:
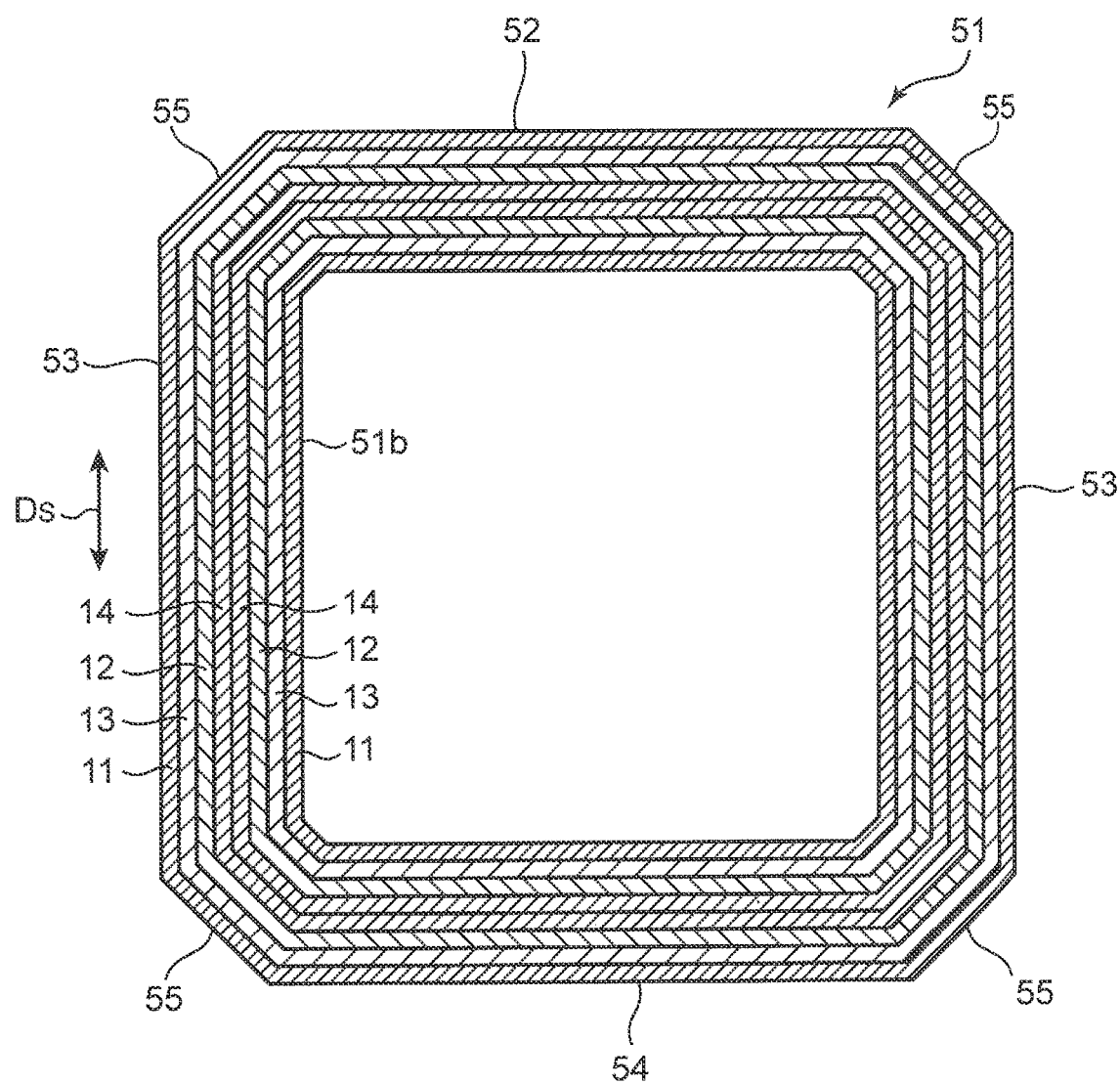
FIG. 17 is a cross-sectional view of a frame which is made of a fiber reinforced composite and has quasi-isotropic properties as a comparative example of the present invention.
Figure 18:
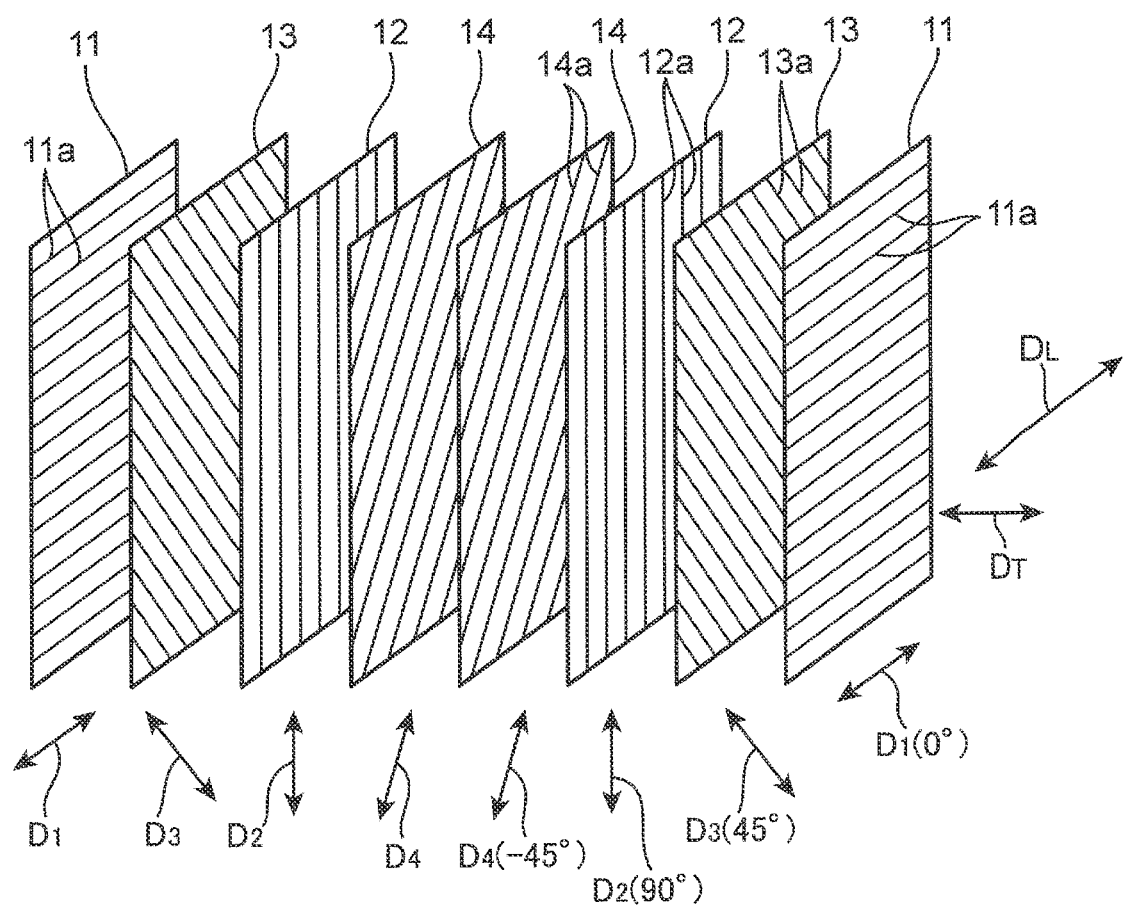
FIG. 18 is an exploded perspective view showing a part of a laminate structure of the frame which is made of a fiber reinforced composite shown in FIG. 17.

In contrast, prepared as a comparative example was a frame which is made of a fiber reinforced composite 51 (hereinafter, referred to as a "frame 51") having quasi-isotropic properties as shown in FIGS. 17 to 18.

The frame 51 according to the comparative example has an enclosed cross-section 51b defining a plurality of corners 55, and includes a compressive wall part 52, a pair of side wall parts 53, and a tension wall part 54 in the same manner as the frame 1.

However, the respective wall parts 52 to 54 in the frame 51 have the same laminate structure. Specifically, each of the wall parts 52 to 54 is configured to include a plurality of longitudinal alignment layers 11, normal directional alignment layers 12, +45-degree alignment layers 13, and −45-degree alignment layers 14 lying on one another at a substantially equal proportion so as to have the quasi-isotropic properties. Further, the longitudinal alignment layers 11, the normal directional alignment layers 12, the +45-degree alignment layers 13, and the −45-degree alignment layers 14 are continuous over the entire periphery of the frame 51 via the corners 55. Accordingly, the respective wall parts 52 to 54 have the same laminate structure.

The frame 51 according to the comparative example having the quasi-isotropic properties shown in FIGS. 17 to 18 was subjected to the check of the bending strength thereof in the same manner as the series of procedures adopted for the frame 1. Results of the check are shown by a curve II in the graph in FIG. 19.

Figure 19:
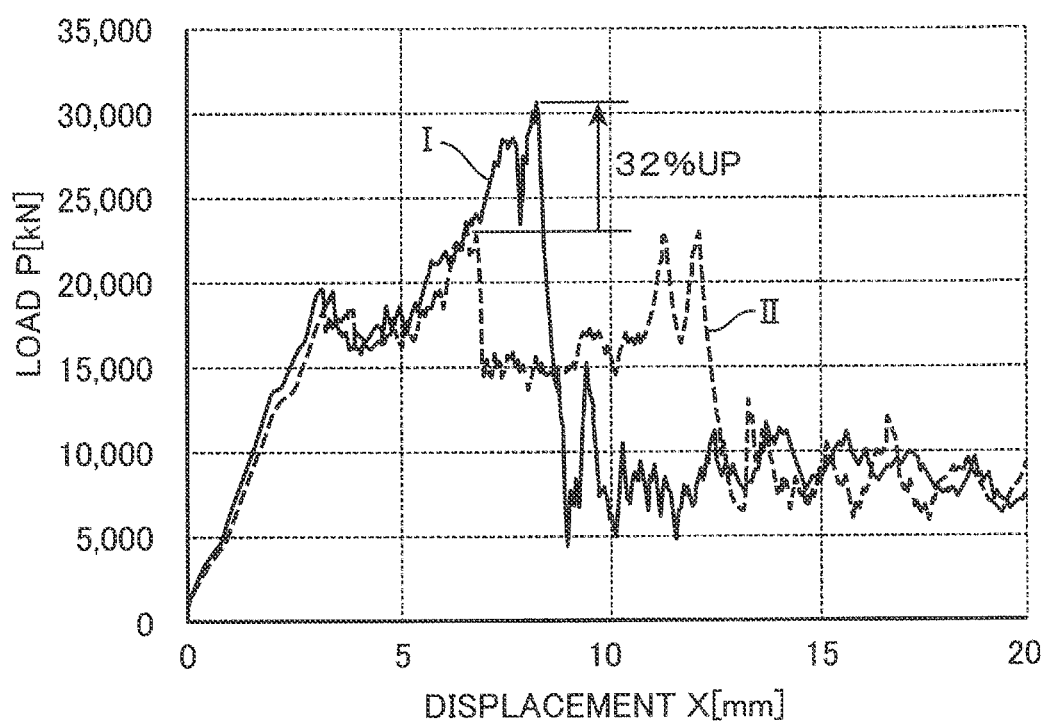
FIG. 19 is a graph showing a comparison between a load distribution concerning a bending load received by the frame which is made of a fiber reinforced composite according to the embodiment and a load distribution concerning a bending load received by the frame according to the comparative example having the quasi-isotropic properties shown in FIG. 17.

It is seen from the graph in FIG. 19 that the curve I representing the bending load P of the frame 1 according to the embodiment has a maximum load improved by 32% from that of a bending load P of the frame 51 according to the comparative example as represented by the curve II. The reason of the difference between the bending loads will be described below. Specifically, the frame 51 according to the comparative example having the quasi-isotropic properties has a low bending strength attributed to occurrence of the buckling. In contrast, the frame 1 according to the embodiment has the increased bending strength by avoiding the buckling. More specifically, this is because the frame 1 according to the embodiment including the larger number of longitudinal alignment layers 11 in the compressive wall part 2 and the larger number of normal directional alignment layers 12 in the surface section of the side wall part 3 as shown in FIG. 3 suppresses extension of a possible crack attributed to occurrence of layer separation at the corner 5 to the compressive wall part 2 and the side wall part 3, and accordingly the buckling of the frame 1 is prevented.

Figure 20:
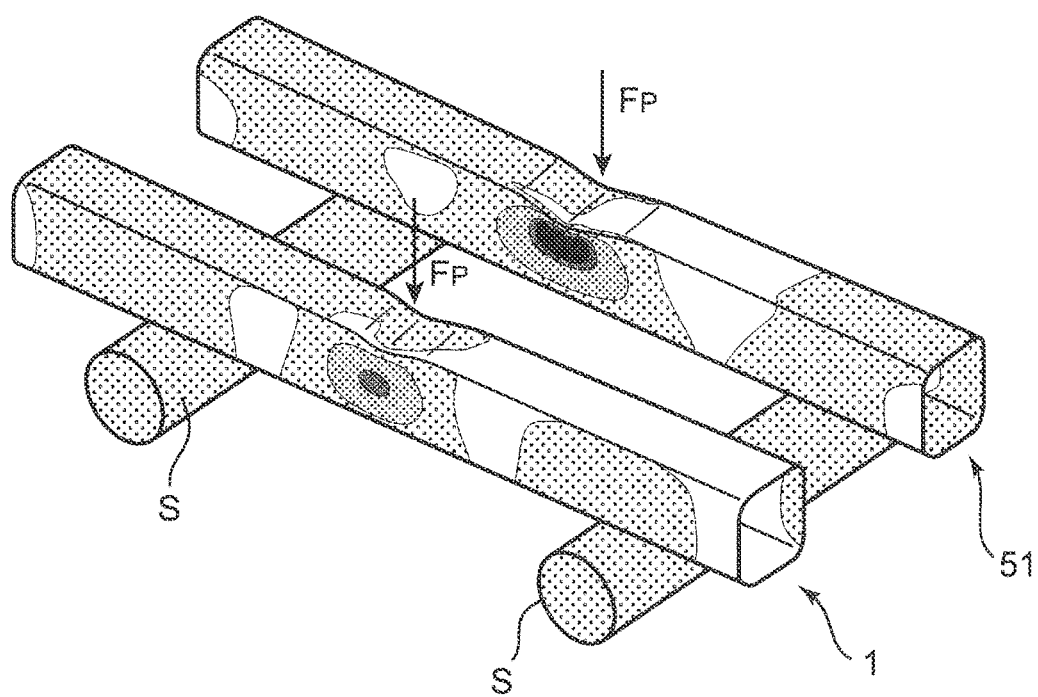
FIG. 20 is a perspective explanatory view showing a comparison between a deformation state of the frame which is made of a fiber reinforced composite according to the embodiment and a deformation state of the frame according to the comparative example having the quasi-isotropic properties shown in FIG. 17 when each frame receives the bending load.

FIG. 20 shows distributions of displacements of respective wall parts in each of the frame 1 according to the embodiment and the frame 51 according to the comparative example as obtained when each frame was bended and deformed. FIG. 20 shows a displacement amount in each wall part with a gray scale. A compressive load $F_P$ was applied to each of the frames 1 and 51 at a middle position between the two fulcrums S. At this time, the displacement amount of each wall part was small in the frame 1 according to the embodiment owing to no occurrence of the buckling (as seen from few dark gray portions of the frame 1 in FIG. 20). In contrast, the displacement amount of each wall part (particularly, the side wall part) was large in the frame 51 according to the comparative example where the buckling occurred (as seen from many dark gray portions of the frame 51 in FIG. 20, the darkness of the portions being deeper).

Figure 21:
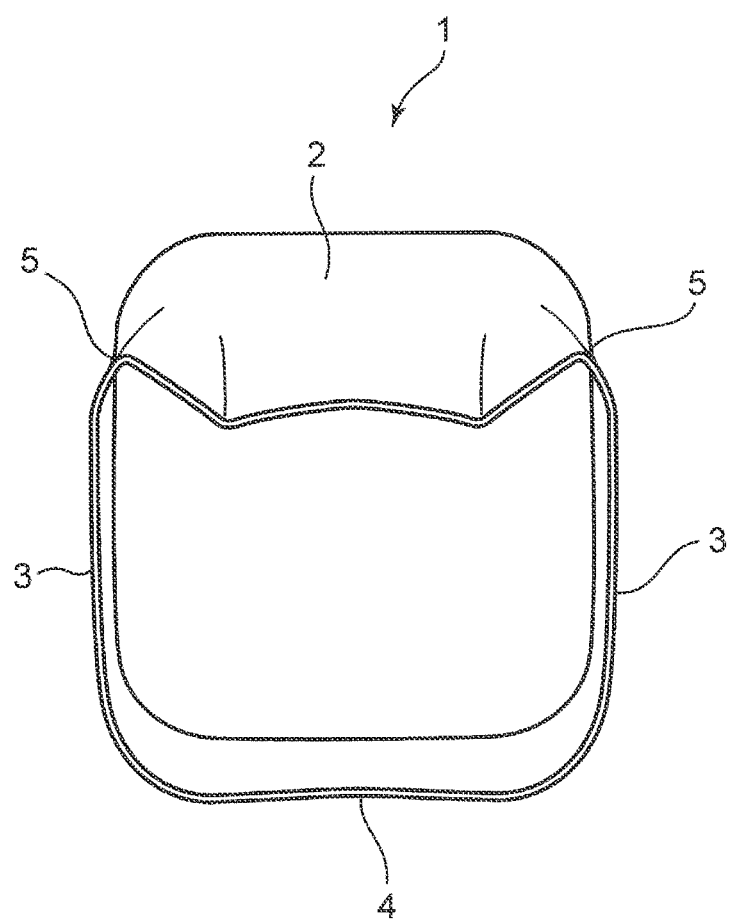
FIG. 21 is a cross-sectional explanatory view showing the deformation state of the frame which is made of a fiber reinforced composite according to the embodiment in FIG. 20 when the frame receives the bending load.
Figure 22:
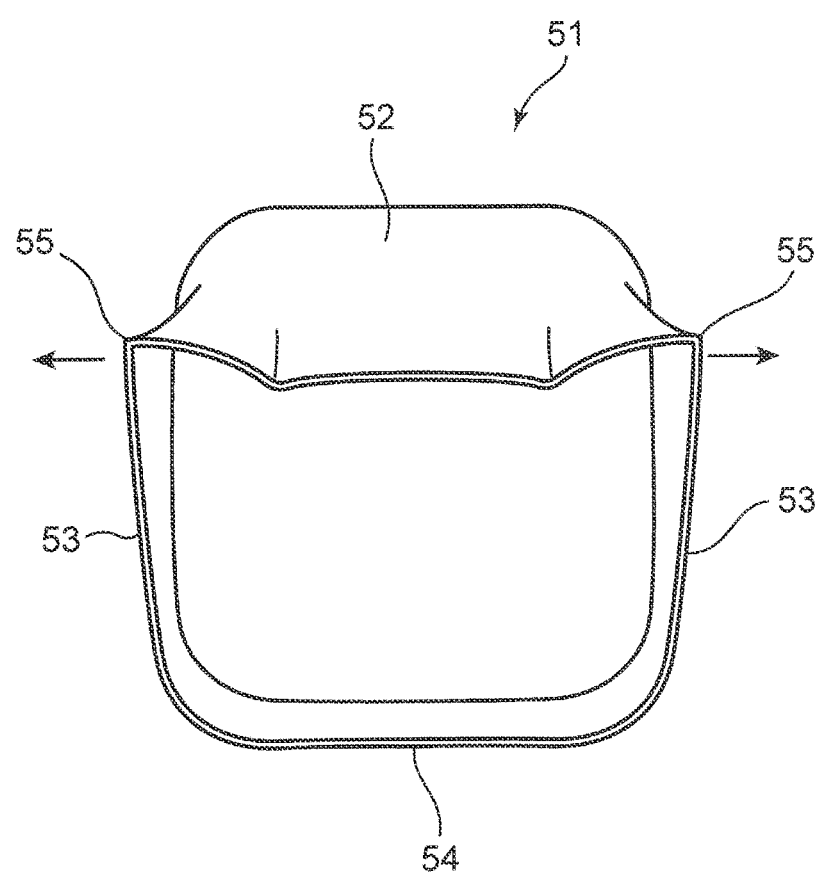
FIG. 22 is a cross-sectional explanatory view showing the deformation state of the frame which is made of a fiber reinforced composite according to the comparative example shown in FIG. 20 when the frame receives the bending load.

When each of the frame 1 according to the embodiment and the frame 51 according to the comparative example is bent and deformed in the aforementioned manner as shown in FIG. 20, the frame 1 according to the embodiment shown in FIG. 21 has a cross-sectional shape with small out-of-plane deformation, i.e., a small change in a distance between two corners 5. In contrast, the frame 51 according to the comparative example shown in FIG. 22 has a cross-sectional shape with large out-of-plane deformation, i.e., a large change in a distance between two corners 55. It is seen from the comparison between FIGS. 21 and 22 that the frame 1 according to the embodiment has a higher bending strength and a more sustainable cross-sectional shape without occurrence of the buckling than the frame 51 according to the comparative example.

Example 2

Figure 23:
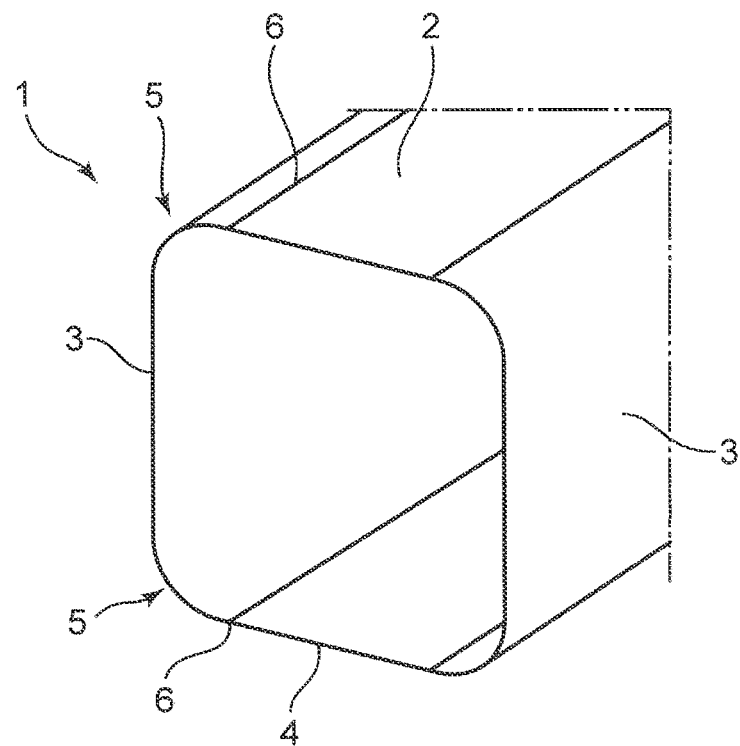
FIG. 23 is a perspective explanatory view showing a simplified configuration of the frame which is made of a fiber reinforced composite according to the embodiment, including a connection section which lies in the compressive wall part and a connection section which lies in the tension wall part.

In the frame 1 according to the embodiment represented by a simplified model shown in FIG. 23, the connection section 6 where layers constituting the compressive wall part 2 are connected to layers constituting the side wall part 3 lies at a position away from the corresponding corners 5, that is, in the compressive wall part 2, and the connection section 6 where layers constituting the tension wall part 4 are connected to layers constituting the side wall part 3 lies at a position away from the corresponding corners 5, that is, in the tension wall part 4. Concerning the frame 1 according to the embodiment, the relation between a downward displacement X of an indenter and a bending load P (i.e., a counterforce which the indenter receives from the frame 1) of the frame 1 according to the embodiment was investigated as shown by a curve III in a graph in FIG. 26 in the same manner as Example 1 described above.

Figure 24:
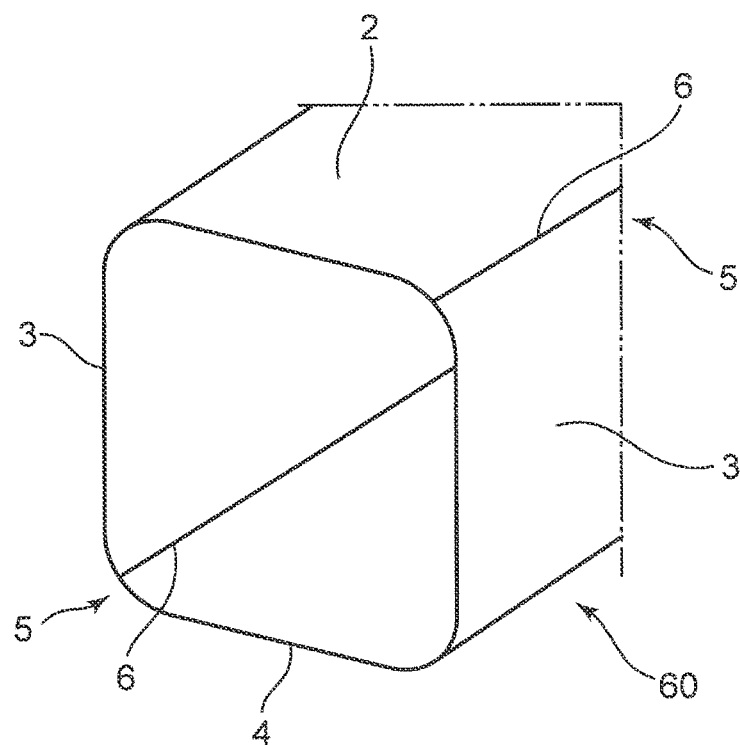
FIG. 24 is a perspective explanatory view showing a simplified configuration of the frame which is made of a fiber reinforced composite according to the comparative example, including a connection section which is at a corresponding corner.
Figure 25:
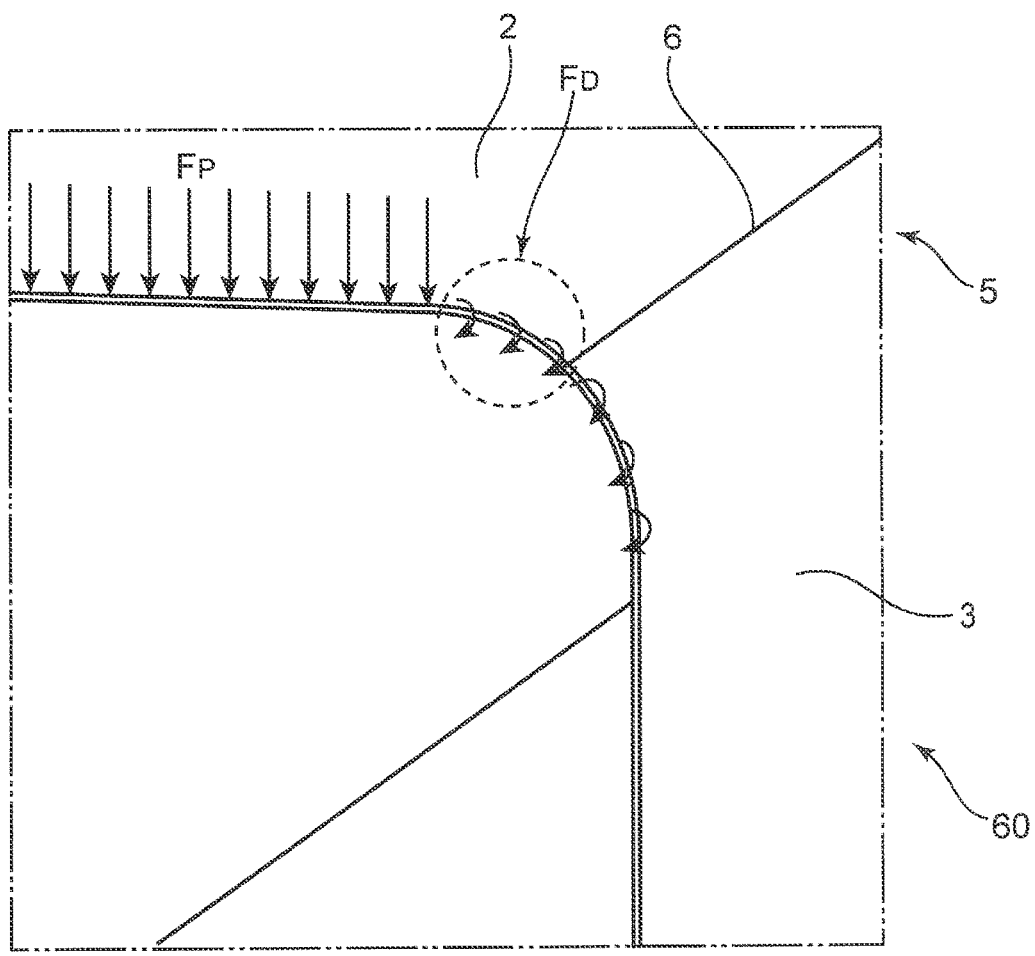
FIG. 25 is a perspective explanatory view showing the frame according to the comparative example in FIG. 24 where a specific section thereof around the corner closer to the compressive wall part receives a local bending load.

In contrast, prepared as a comparative example was a frame which is made of a fiber reinforced composite 60 (hereinafter, referred to as a "frame 60") as shown in FIGS. 24 to 25. In the frame 60 according to the comparative example, a connection section 6 where layers constituting a compressive wall part 2 are connected to layers constituting a side wall part 3 and a connection where layers constituting a tension wall part 4 are connected to layers constituting the side wall part 3 lie at corresponding corners 5.

The frame 60 according to the comparative example shown in FIGS. 24 to 25 was subjected to the check of the bending strength thereof in accordance with the same series of procedures as those adopted for the frame 1. Results of the check are shown by a carve IV in the graph in FIG. 26.

Figure 26:
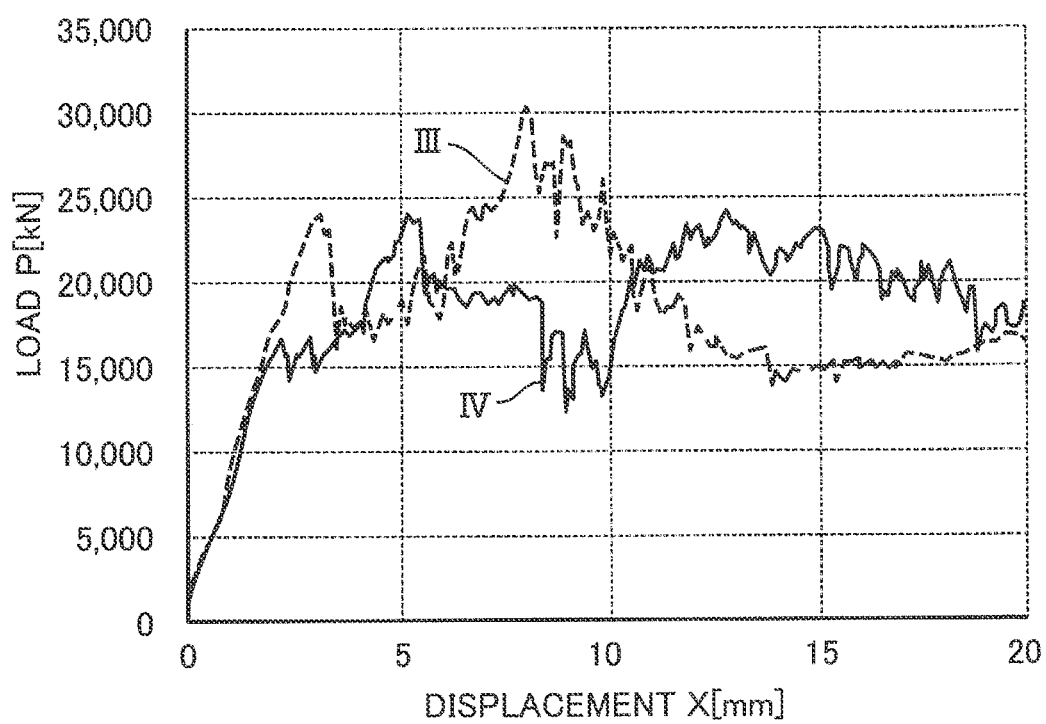
FIG. 26 is a graph showing a comparison between a load distribution concerning a bending load received by the frame which is made of a fiber reinforced composite according to the embodiment and a load distribution concerning a bending load received by the frame according to the comparative example in FIG. 24 having the connection section at the corner.

It is seen from the graph in FIG. 26 that the curve III representing the bending load P of the frame 1 according to the embodiment shows improvement at an earlier stage (10 to 11 mm or shorter) of the displacement X than a curve IV representing the bending load P of the frame 60 according to the comparative example where the connection section 6 is at the corner 5. It is further seen that the frame 1 according to the embodiment has a greater absorbing energy at an initial stage (e.g., at a stage immediately after a vehicle collision) when the frame 1 according to the embodiment receives the bending load than the frame 60.

The reason of the difference between the bending loads will be described below. Specifically, the frame 60 according to the comparative example shown in FIGS. 24 to 25 has the configuration where the longitudinal alignment layer 11 (see FIGS. 3 to 4) included in the compressive wall part 2 extends to reach the corresponding corner 5. Hence, a local bending load $F_D$ different from the compressive load $F_P$ occurs in the longitudinal alignment layer 11 included in the compressive wall part 2 around the corner 5, and the bending strength decreases due to occurrence of the buckling starting from the connection section 6 at the corner 5. In contrast, the frame 1 according to the embodiment has the increased bending strength by avoiding the buckling at the corners 5. More specifically, in the frame 1 according to the embodiment, as described above, the connection section 6 where the layers constituting the compressive wall part 2 are connected to the layers constituting the side wall part 3 lies in the compressive wall part 2, and the connection section 6 where the layers constituting the tension wall part 4 are connected to the layers constituting the side wall part 3 lies in the tension wall part 4, the connection sections being away from the corresponding corners 5 of the frame 1. Consequently, buckling starting from the connection section 6 is suppressible at each corner 5.

Modifications (A)

As shown in FIGS. 3 to 4, the compressive wall part 2 in the frame 1 according to the embodiment is configured to include the two longitudinal alignment layers 11, the four normal directional alignment layers 12, and the two longitudinal alignment layers 11 lying on one another without any +45-degree alignment layer 13 and −45-degree alignment layer 14, but the present invention is not limited thereto.

Figure 7:
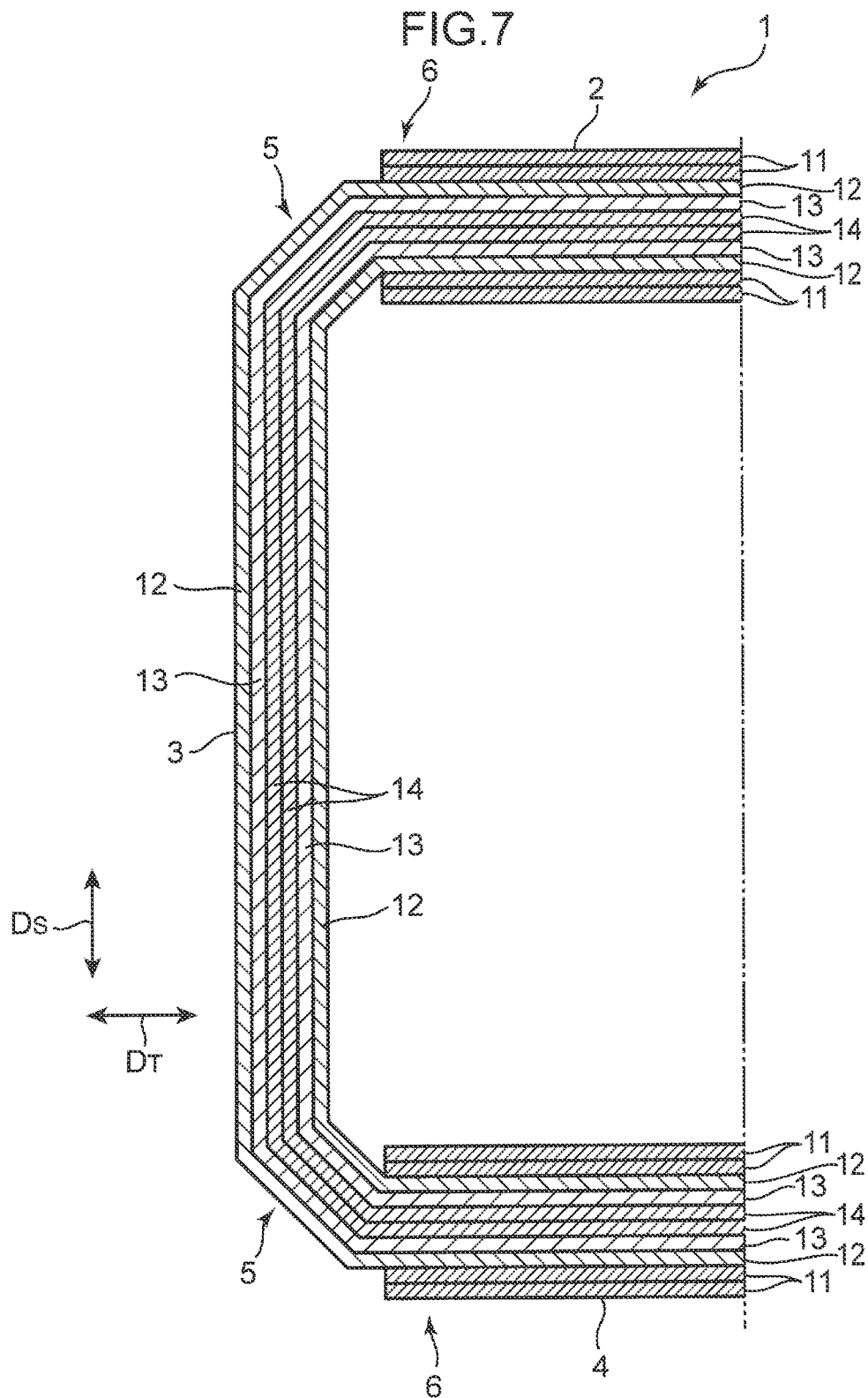
FIG. 7 is an enlarged cross-sectional view of a frame which is made of a fiber reinforced composite according to a modification of the present invention.

Specifically, for example, a compressive wall part 2 in a frame 1 according to a modification of the present invention shown in FIG. 7 may be configured to include a +45-degree alignment layer 13 and a −−45-degree alignment layer 14. For instance, the compressive wall part 2 in the frame 1 shown in FIG. 7 may be configured to include two longitudinal alignment layers 11, one normal directional alignment layer 12, one +45-degree alignment layer 13, two −45-degree alignment layers 14, one +45-degree alignment layer 13, one normal directional alignment layer 12, and two longitudinal alignment layers 11 lying on one another.

In the frame 1 shown in FIG. 7, the one normal directional alignment layer 12, the one +45-degree alignment layer 13, the two −45-degree alignment layers 14, the one +45-degree alignment layer 13, and the one normal directional alignment layer 12 extend over the entire periphery of the frame 1, and each of the compressive wall part 2 and the tension wall part 4 includes the two longitudinal alignment layers 11 in each of an inner surface section and an outer surface section thereof.

In the frame 1 shown in FIG. 7, even the compressive wall part 2 configured to include the +45-degree alignment layers 13 and the −45-degree alignment layers 14 includes the two longitudinal alignment layers 11 in each of the inner surface section and the outer surface section thereof. The compressive wall part 2 can withstand a much higher compressive stress σ1 and can have an increased buckling strength owing to this arrangement in this configuration. The bending stiffness is improvable as well.

The frame 1 according to the modification shown in FIG. 7 can exert the same operational effects described in features (1) to (10) of the embodiment as well.

(B)

As shown in FIG. 3 and FIG. 5, in the frame 1 according to the embodiment, the −45-degree alignment layer 14 is at a center of the side wall part 3 in the thickness direction thereof, but the present invention is not limited thereto.

Figure 8:
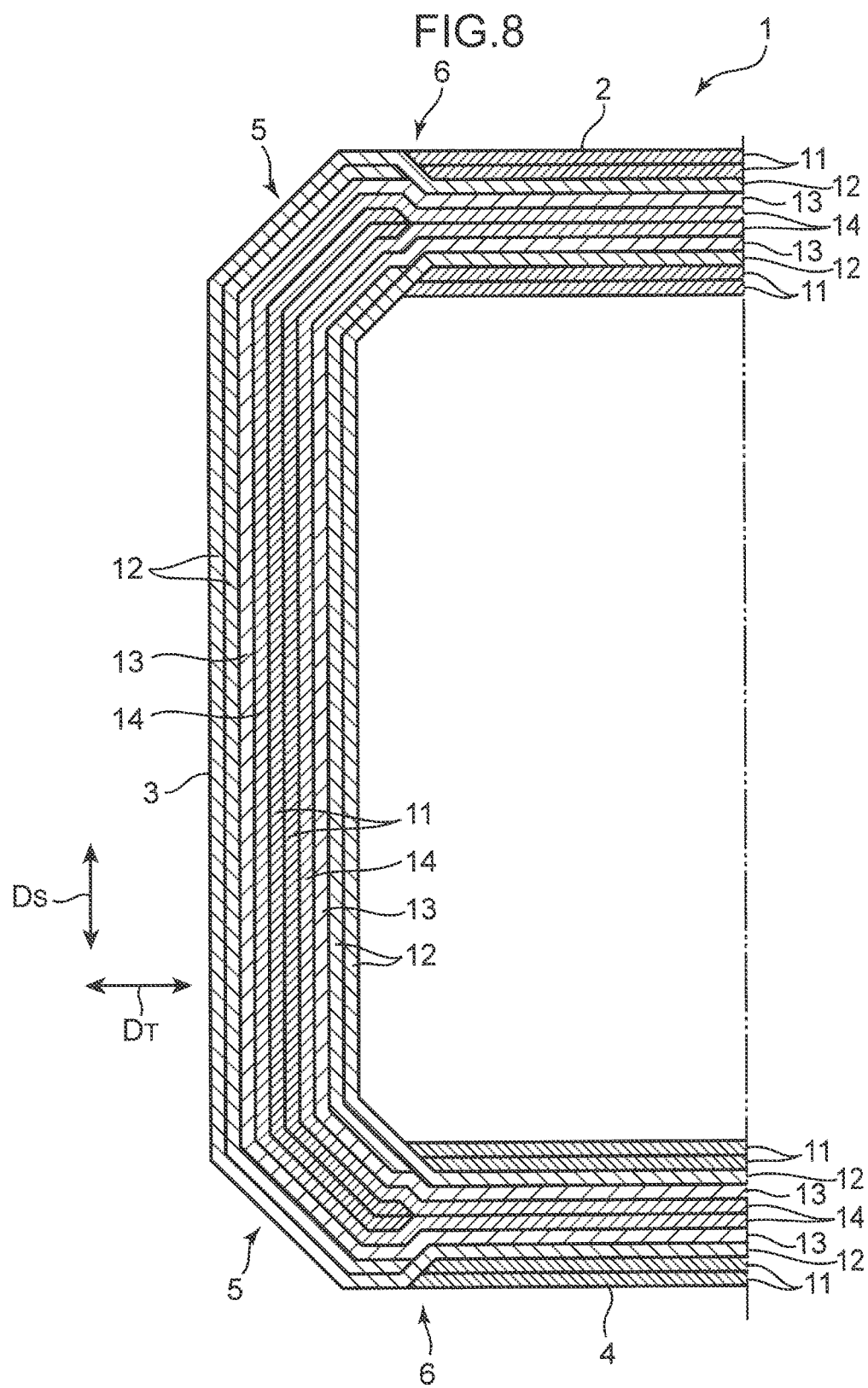
FIG. 8 is an enlarged cross-sectional view of a frame which is made of a fiber reinforced composite according to another modification of the present invention.

Specifically, for example, a side wall part 3 in a frame 1 according to another modification shown in FIG. 8 (as well as in FIGS. 10 to 11 and FIGS. 14 to 16) further includes a longitudinal alignment layer 11. The longitudinal alignment layer 11 in the side wall part 3 may be located closer to a center of the side wall part 3 in the thickness direction thereof (specifically, in a center section of the side wall part 3 in the thickness direction thereof as shown in FIG. 8) than the differential alignment layer (such as the normal directional alignment layer 12, +45-degree alignment layer 13, and the −45-degree alignment layer 14 in the embodiment).

When the frame 1 receives the bending load $F_B$, the compressive stress and the tensile stress tend to be small in the normal direction $D_S$, i.e., the circumferential direction of the cross-section, at a position closer to the center of the side wall part 3 in the thickness direction thereof. Therefore, the configuration shown in FIG. 8 (as well as FIGS. 10 to 11 and 14 to 16) where the side wall part 3 includes the longitudinal alignment layer 11 located closer to the center of the side wall part 3 (specifically, in the center section) in the thickness direction thereof than the differential alignment layer can decrease the influence of the compressive stress and the tensile stress in the circumferential direction of the cross-section that is disadvantageous for the shear stress to the longitudinal alignment layer 11, and further can suppress the deformation of the side wall part 3 owing to the differential alignment layer located closer to the surface than the longitudinal alignment layer 11.

(C)

A frame 1 shown in FIG. 8 based on a frame having quasi-isotropic properties is configured so that each of a compressive wall part 2 and a tension wall part 4 additionally includes longitudinal alignment layers 11 in a surface section thereof and a side wall part 3 additionally includes normal directional alignment layer 12. This configuration can exert the same operational effects described in features (1) to (10) of the embodiment as well.

(D)

Figure 9:
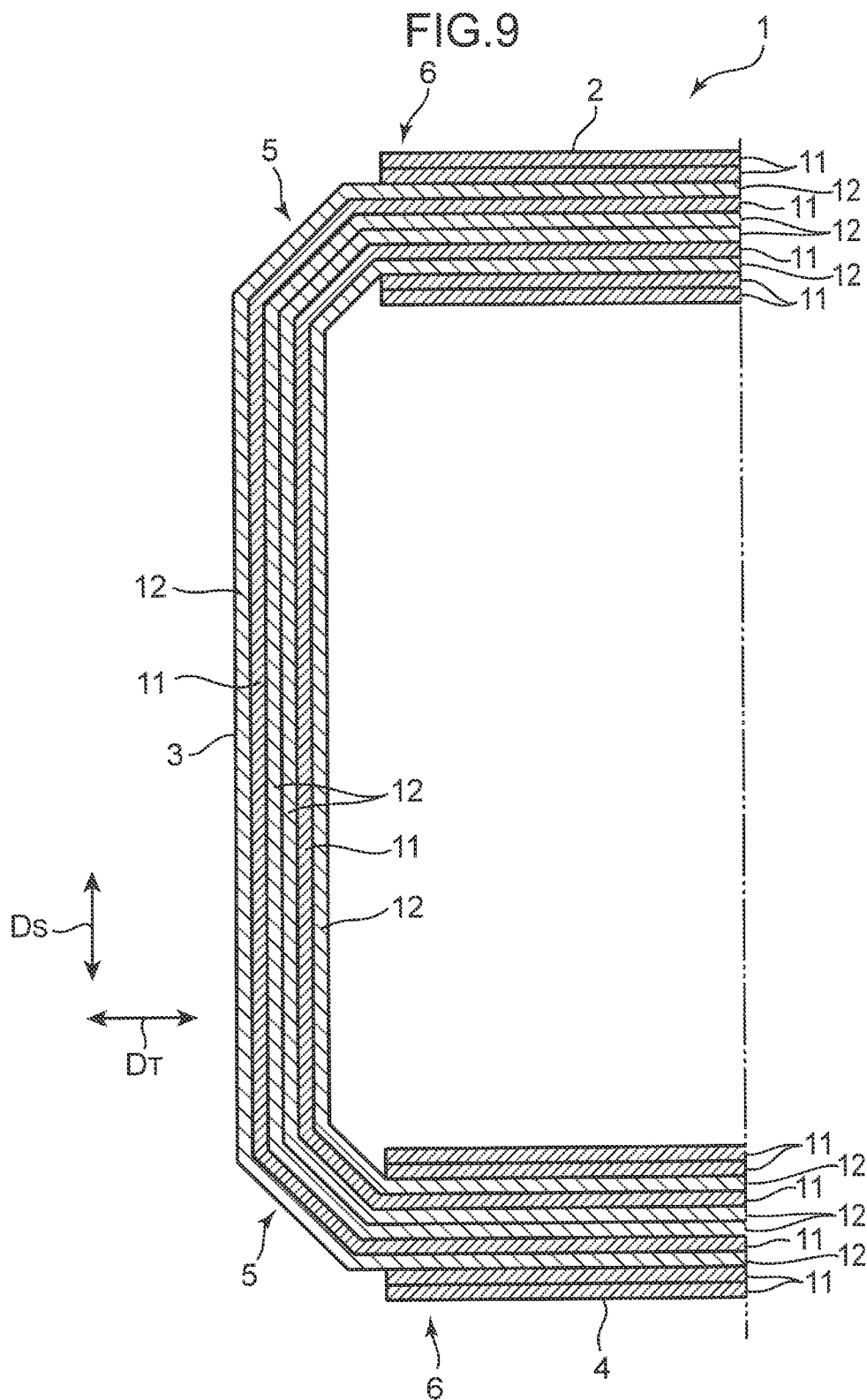
FIG. 9 is an enlarged cross-sectional view of a frame which is made of a fiber reinforced composite according to further another modification of the present invention.

A frame 1 according to further another modification shown in FIG. 9 including a longitudinal alignment layer 11 and a normal directional alignment layer 12 as the basis is configured so that each of a compressive wall part 2 and a tension wall part 4 additionally includes longitudinal alignment layers 11 in a surface section thereof.

In the frame 1 shown in FIG. 9, one normal directional alignment layer 12, one longitudinal alignment layer 11, two normal directional alignment layers 12, one longitudinal alignment layer 11, and one normal directional alignment layer 12 extend over the entire periphery of the frame 1, and each of the compressive wall part 2 and the tension wall part 4 includes two longitudinal alignment layers 11 in each of an inner surface section and an outer surface section thereof.

This configuration can exert the same operational effects described in features (1) to (2), (4) to (5), and (7) to (10) as well.

(E)

Figure 10:
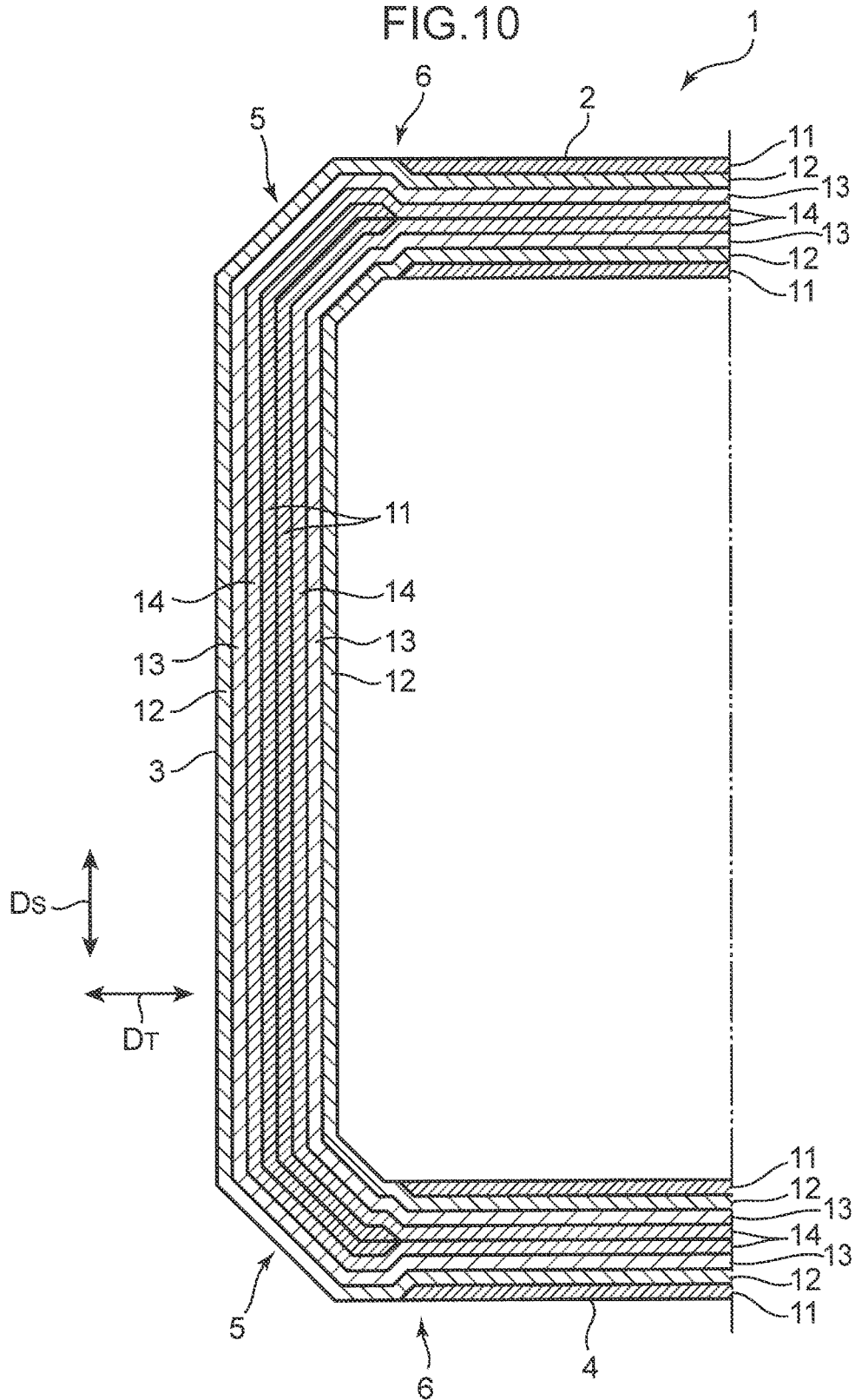
FIG. 10 is an enlarged cross-sectional view of a frame which is made of a fiber reinforced composite according to still another modification of the present invention.

A frame 1 according to still another modification shown in FIG. 10 is configured to include alignment layers 11 to 14 in an optimized arrangement in a plate thickness direction at an equal arrangement ratio of the alignment layers 11 to 14. In the frame 1 shown in FIG. 10, longitudinal alignment layers 11 lie in each of an inner surface section and an outer surface section each of a compressive wall part 2 and a tension wall part 4. Normal directional alignment layers 12 lie in in each of an inner surface section and an outer surface section each of the side wall parts 3. This configuration can exert the same operational effects as described in features (1) to (5) and (7) to (10) as well.

(F)

A frame 1 according to further another still modification shown in FIG. 1, based on the frame having quasi-isotropic properties in the same manner as the frame 1 shown in FIG. 8, is configured so that each of a compressive wall part 2 and a tension wall part 4 includes a longitudinal alignment layer 11 in a surface section thereof, and a side wall part 3 includes a normal directional alignment layer 12 in a surface section thereof. This configuration can exert the same operational effects as described in features (1) to (5) and (7) to (10) as well.

(G)

As described above, in the frame 1 according to the embodiment shown in FIGS. 1 to 5 and the frame 1 shown in each of FIGS. 7 to 11, each of the compressive wall part 2 and the tension wall part 4 includes the longitudinal alignment layer 11 in the surface section thereof, but the present invention is not limited thereto.

Specifically, in the present invention, the compressive wall part 2 is sufficient to include the longitudinal alignment layer 11 and the side wall part 3 is sufficient to include the normal directional alignment layer in the surface section thereof. Hence, for example, each of a compressive wall part 2 and a tension wall part 4 in a frame 1 according to further still another modification shown in each of FIGS. 12 to 16 may include, for example, a +45-degree alignment layer 13 at a position closer to the surface thereof than the longitudinal alignment layer 11, in addition to the longitudinal alignment layer 11. The frame 1 shown in each of FIGS. 12 to 16 can exert the same operational effects described in features (1) to (6) and (8) to (10) of the embodiment (except that the configurations shown in FIGS. 14 to 16 exclude the effect described in feature (6)).

Figure 12:
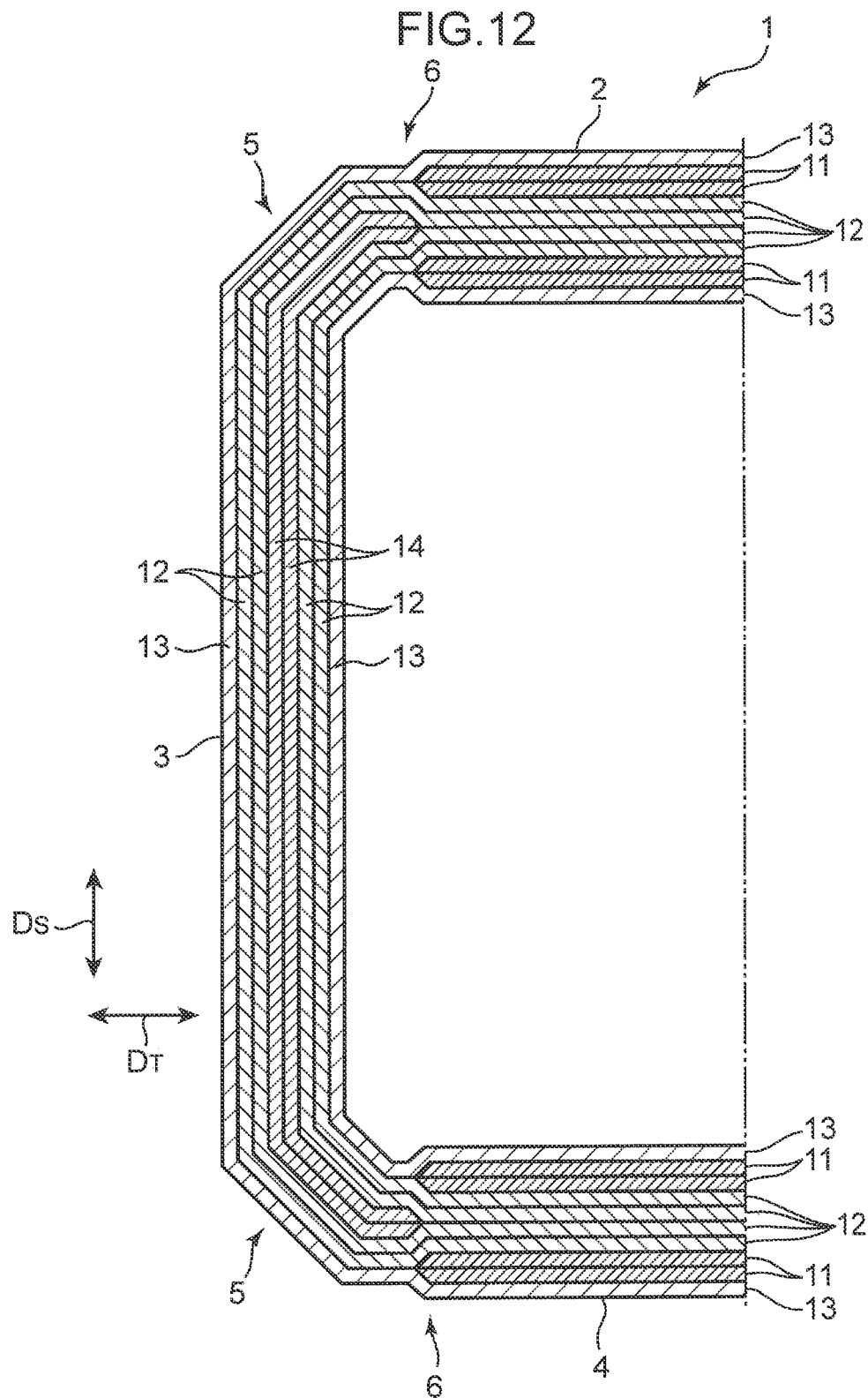
FIG. 12 is an enlarged cross-sectional view of a frame which is made of a fiber reinforced composite according to further still another modification of the present invention.

The frame 1 according to still further another modification shown in FIG. 12 has a configuration corresponding to the configuration of the frame 1 according to the embodiment shown in FIG. 3 except that each of a compressive wall part 2 and a tension wall part 4 additionally includes a +45-degree alignment layer 13 in a surface section thereof, and a side wall part 3 includes a +45-degree alignment layer 13 in a surface section thereof in still further another modification.

Figure 13:
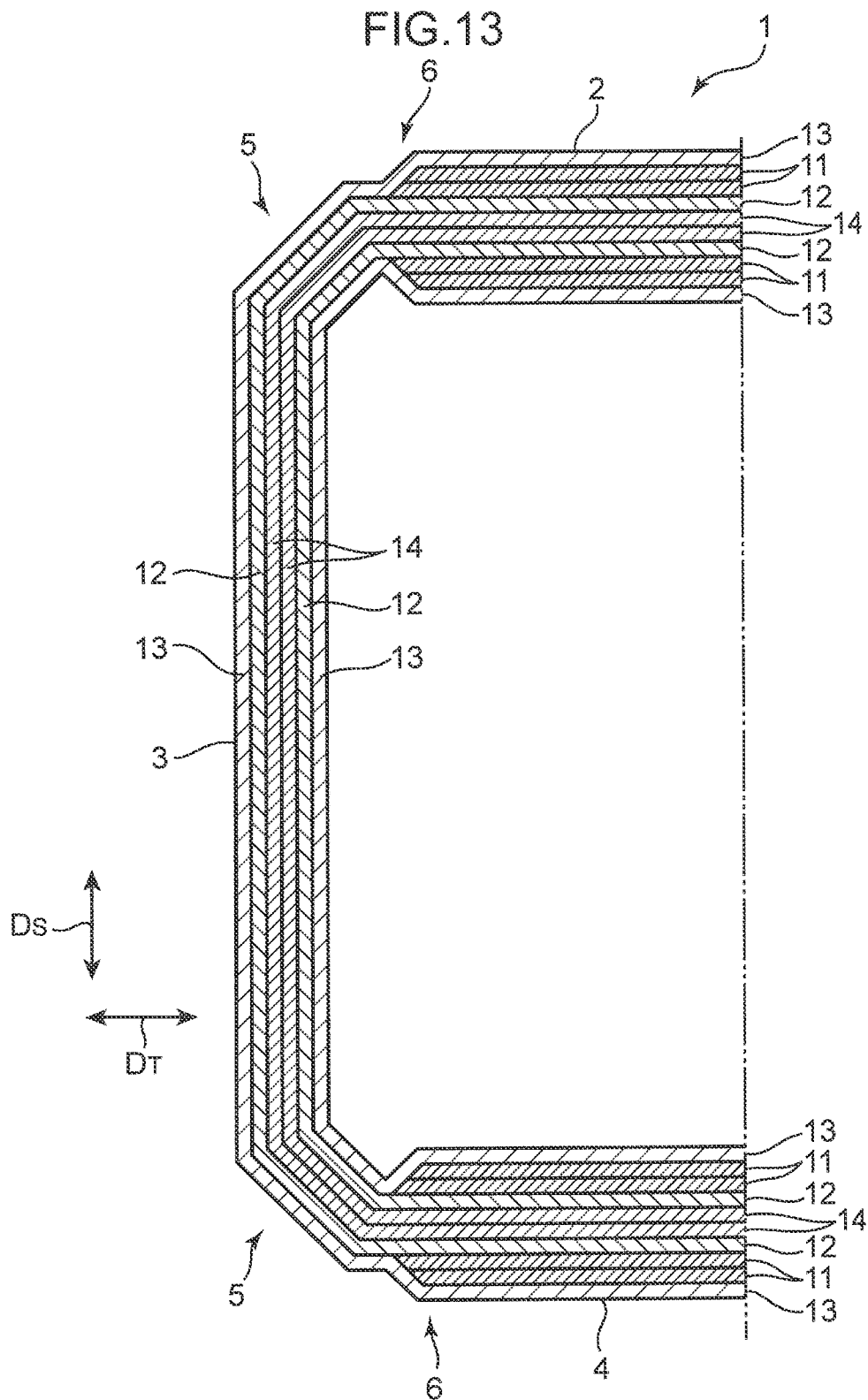
FIG. 13 is an enlarged cross-sectional view of a frame which is made of a fiber reinforced composite according to further still another modification of the present invention.

The frame 1 according to still further another modification shown in FIG. 13 has a configuration corresponding to the configuration of the frame 1 according to the modification shown in FIG. 7 except that each of a compressive wall part 2, a side wall part 3, and a tension wall part 4 includes a +45-degree alignment layer 13 in a surface section thereof in still further another modification.

Figure 14:
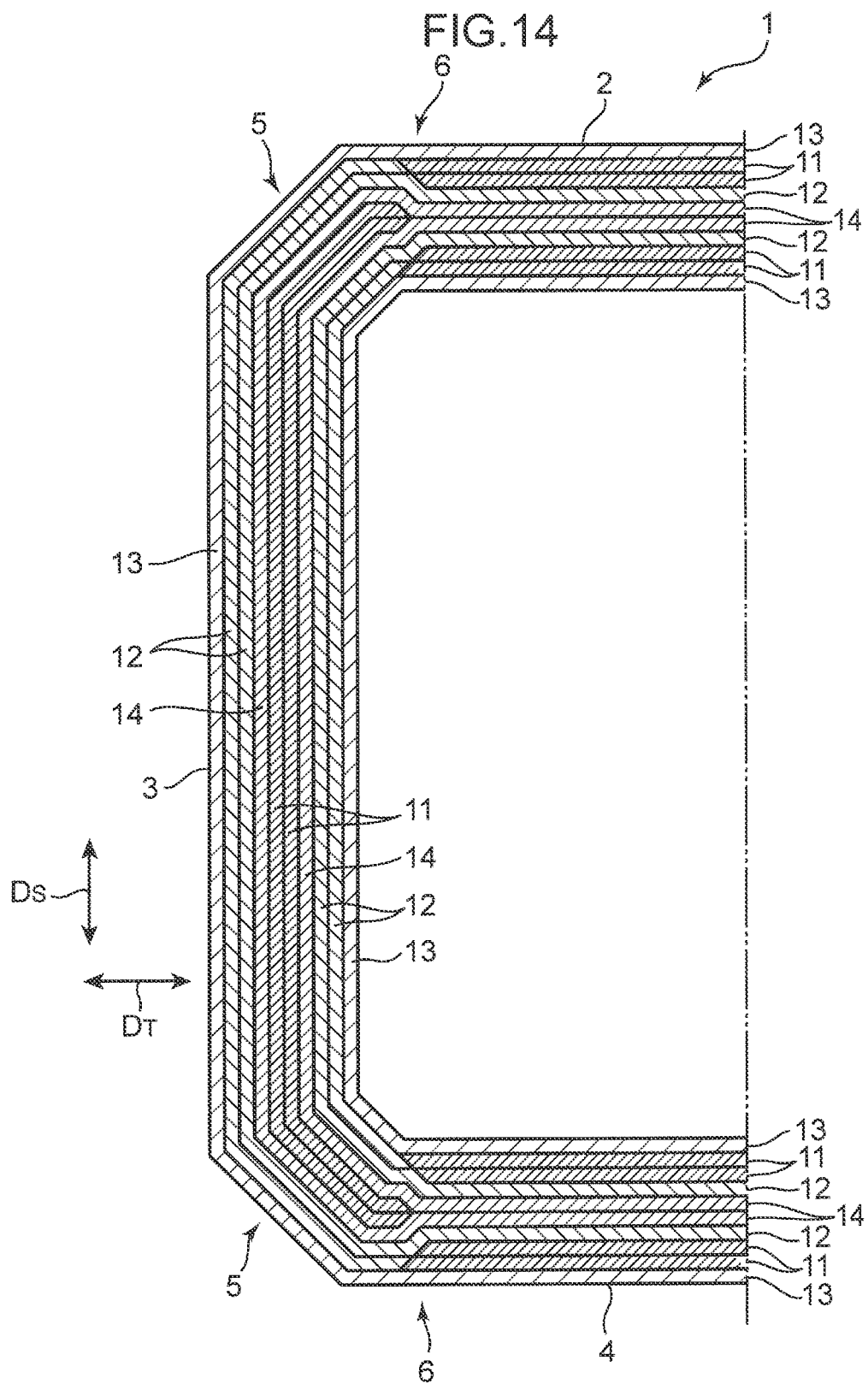
FIG. 14 is an enlarged cross-sectional view of a frame which is made of a fiber reinforced composite according to further still another modification of the present invention.

The frame 1 according to still further another modification shown in FIG. 14 has a configuration corresponding to the configuration of the frame 1 according to the modification shown in FIG. 8 except that each of a compressive wall part 2, a side wall part 3, and a tension wall part 4 has a +45-degree alignment layer 13 in a surface section thereof in still further another modification.

Figure 15:
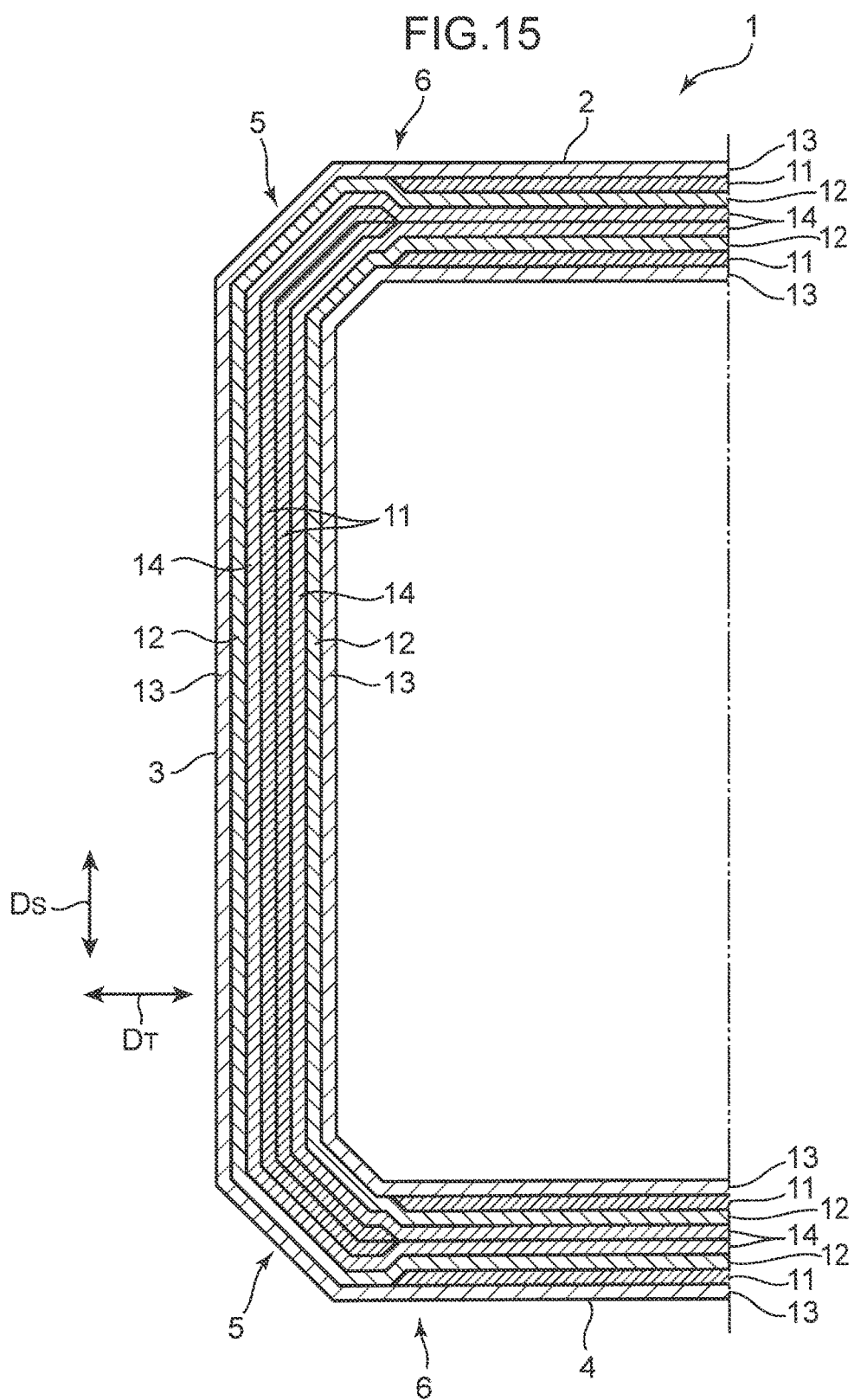
FIG. 15 is an enlarged cross-sectional view of a frame which is made of a fiber reinforced composite according to further still another modification of the present invention.

The frame 1 according to still further another modification shown in FIG. 15 has a configuration corresponding to the configuration of the frame 1 according to the modification shown in FIG. 10 except that each of a compressive wall part 2, a side wall part 3, and a tension wall part 4 has a +45-degree alignment layer 13 in a surface section thereof in still further another modification.

Figure 16:
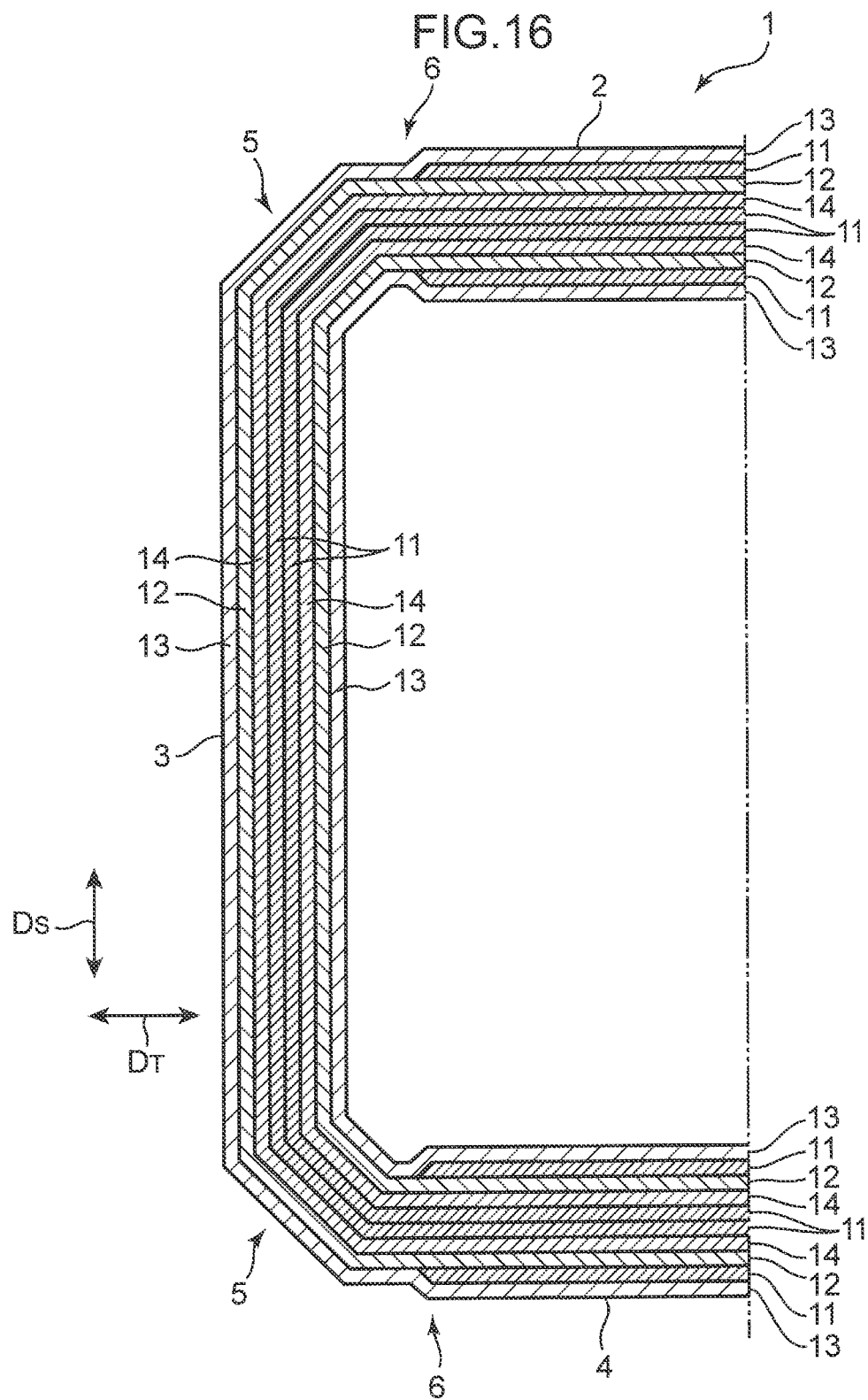
FIG. 16 is an enlarged cross-sectional view of a frame which is made of a fiber reinforced composite according to further still another modification of the present invention.

The frame 1 according to still further another modification shown in FIG. 16 has a configuration corresponding to the configuration of the frame 1 according to the modification shown in FIG. 11 except that each of a compressive wall part 2, a side wall part 3, and a tension wall part 4 has a +45-degree alignment layer 13 in a surface section thereof in still further another modification.

(H)

The operational effects of the present invention are obtainable at the alignment angles of the reinforcement fibers as described in the embodiment and the modifications, e.g., at "0 degree", "90 degrees". "45 degrees", and "−45 degrees", and further at other angles within a range of 15 degrees of each of these angles.

A frame which is made of a fiber reinforced composite as described in relation to the embodiment mainly includes the features described below. A frame which is made of a fiber reinforced composite according to the embodiment has an enclosed cross-section defining a plurality of corners, and has a predetermined length. The frame includes: a compressive wall part where a compressive stress occurs in a longitudinal direction of the frame when the frame receives a bending load in a normal direction perpendicularly intersecting the longitudinal direction; and a side wall part extending in the normal direction and defining one of the corners with the compressive wall part. The compressive wall part includes a longitudinal alignment layer having reinforcement fibers aligned in the longitudinal direction. The side wall part has a surface section composed of a differential alignment layer having reinforcement fibers aligned in a direction different from the longitudinal direction.

In this configuration, the compressive stress occurs in the compressive wall part in the longitudinal direction of the frame when the frame receives the bending load for bending the frame in a direction perpendicularly intersecting the longitudinal direction thereof. The compressive wall part including the longitudinal alignment layer extending in the longitudinal direction of the frame can withstand the compressive stress even at a high value, and the compressive wall part further can have an increased buckling strength. The bending stiffness is improvable as well. Further, the side wall part has the surface section composed of the differential alignment layer having the reinforcement fibers aligned in a direction different from the longitudinal direction (e.g., in the normal direction of the frame or in a diagonal direction at a specific angle to the longitudinal direction of the frame, in the side wall part). The side wall part having this configuration can withstand a high shear stress and a high bending stress, and thus deformation (particularly, buckling deformation) of the side wall part is suppressible. This configuration can prevent a crack attributed to occurrence of layer separation at the corner of the frame from extending to the compressive wall part and the side wall part, and accordingly can enhance the buckling resistance of the frame. As a result, the frame can have an increased bending strength by avoiding the buckling of the entirety of the frame.

Here, the term "surface section" of the side wall part in the present invention covers each of an inner surface section and an outer surface section of the frame in the cross-section thereof.

In the frame, the differential alignment layer preferably includes a normal directional alignment layer having reinforcement fibers aligned in the normal direction.

In this configuration, the differential alignment layer composing the surface section of the side wall part includes the normal directional alignment layer having the reinforcement fibers aligned in the normal direction of the frame. Therefore, the stiffness (e.g., the bending stiffness against a load applied in a specific direction for causing deformation in the normal direction) of the side wall part in the normal direction is improvable.

In the frame, the differential alignment layer preferably includes a 45-degree alignment layer having reinforcement fibers aligned in a direction at an angle of 45 degrees to the longitudinal direction.

This configuration can improve the shear stiffness of the side wall part.

The frame preferably further includes a tension wall part which is away from the compressive wall part and extends in the longitudinal direction, and where a tensile stress occurs in the longitudinal direction when the frame receives the bending load. The tension wall part preferably includes a longitudinal alignment layer.

In this configuration, the tensile stress occurs in the tension wall part, which is away from the compressive wall part in the normal direction of the frame, in the longitudinal direction of the frame when the frame receives the bending load. The tension wall part including the longitudinal alignment layer can have an increased tensile strength. As a result, the frame can have a further increased bending strength by effectively avoiding the buckling of the entirety of the frame.

In the frame, a connection section where layers constituting the compressive wall part are connected to layers constituting the side wall part preferably lies in the compressive wall part, and/or a connection section where layers constituting the tension wall part are connected to layers constituting the side wall part preferably lies in the tension wall part.

In the configuration, the connection section where the layers constituting the compressive wall part are connected to the layers constituting the side wall part lies in the compressive wall part, and/or the connection section where the layers constituting the tension wall part are connected to the layers constituting the side wall part lies in the tension wall part, the connection sections being away from the corresponding corners of the frame. Consequently, buckling starting from the connection section is suppressible at each corner.

In the frame, the longitudinal alignment layer is preferably out of the corners.

In this configuration, the longitudinal alignment layer is out of the corners of the frame. This arrangement can minimize possible damage caused by layer separation which occurs at the corner and a crack attributed thereto, resulting in further successful suppression of the buckling at the corner.

In the frame, the longitudinal alignment layer lies preferably in an inner surface section and/or an outer surface section of the compressive wall part.

When the frame receives the bending load, the compressive stress becomes the largest in the inner surface section and the outer surface section of the compressive wall part, and the distortion in the compressive wall part reaches a maximum. The longitudinal alignment layer lying in an inner surface section and/or an outer surface section of the compressive wall part can withstand a much higher compressive stress, and the compressive wall part further can have an increased buckling strength owing to the arrangement in this configuration. The bending stiffness is improvable as well.

In the frame, the compressive wall part preferably further includes a normal directional alignment layer having reinforcement fibers aligned in the normal direction. Further, the longitudinal alignment layer is preferably located closer to a surface of the compressive wall part than the normal directional alignment layer.

When the frame receives the bending load, the compressive stress tends to be larger at a position closer to the surface of the compressive wall part. The compressive wall part including the longitudinal alignment layer located closer to the surface thereof than the normal directional alignment layer can withstand a much higher compressive stress, and further can have an increased buckling strength owing to the arrangement in this configuration. The bending stiffness is improvable as well.

In this configuration, the longitudinal alignment layer may be located only in the surface section, or in each of the surface section and the center section of the compressive wall part.

In the frame, the differential alignment layer of the side wall part preferably includes a normal directional alignment layer having reinforcement fibers aligned in the normal direction. Further, the normal directional alignment layer of the compressive wall part and the normal directional alignment layer of the side wall part are preferably continuous from the compressive wall part to the side wall part.

In this configuration, the normal directional alignment layers continuously extend from the compressive wall part to the side wall part. This configuration can suppress such deformation that the entire periphery of the frame in the cross-section thereof is deformed in the normal direction, and accordingly can further increase the bending strength of the frame.

In the frame, the side wall part preferably further includes a longitudinal alignment layer which is located closer to a center of the side wall part in a thickness direction thereof than the differential alignment layer.

When the frame receives the bending load, the compressive stress and the tensile stress tend to be small in the normal direction, i.e., the circumferential direction of the cross-section, at a position closer to the center of the side wall part in the thickness direction thereof. Therefore, the configuration where the side wall part includes the longitudinal alignment layer located closer to the center of the side wall part in the thickness direction thereof than the differential alignment layer can decrease the influence of the compressive stress and the tensile stress in the circumferential direction of the cross-section that is disadvantageous for the shear stress to the longitudinal alignment layer, and further can suppress the deformation of the side wall part owing to the differential alignment layer located closer to the surface than the longitudinal alignment layer.

The frame preferably constitutes at least one selected from the group consisting of a center pillar, a bumper beam, a side sill, a hinge pillar, a front pillar, and a crossmember forming a body of a vehicle.

In this configuration, the frame is applied to at least one of the center pillar, the bumper beam, the side sill, the hinge pillar, the front pillar, and the crossmember forming the body of the vehicle. Accordingly, the frame can withstand the bending load by avoiding the buckling of the entirety of the frame when the frame constituting each member forming the body receives the bending load at a vehicle collision. Consequently, the stiffness of the body of the vehicle is improvable.

The frame which is made of a fiber reinforced composite according to the embodiment can have an increased bending strength by suppressing occurrence of buckling in the frame.

This application is based on Japanese Patent application No. 2021-045402 filed in Japan Patent Office on Mar. 19, 2021, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A frame which is made of a fiber reinforced composite, has an enclosed cross-section defining a plurality of corners, and has a predetermined length, the frame comprising:
   a compressive wall part where a compressive stress occurs in a longitudinal direction of the frame when the frame receives a bending load in a normal direction perpendicularly intersecting the longitudinal direction;
   a side wall part extending in the normal direction and defining one of the corners with the compressive wall part; and
   a tension wall part which is away from the compressive wall part and extends in the longitudinal direction, and where a tensile stress occurs in the longitudinal direction when the frame receives the bending load, wherein
   each of the compressive wall part and the tension wall part includes a longitudinal alignment layer having reinforcement fibers aligned in the longitudinal direction,
   the side wall part has a surface section composed of a differential alignment layer having reinforcement fibers aligned in a direction different from the longitudinal direction, a connection section where layers constituting the compressive wall part are connected to layers constituting the side wall part lies in the compressive wall part, and/or a connection section where layers constituting the tension wall part are connected to layers constituting the side wall part lies in the tension wall part, and
the connection section is away from the corresponding corners of the frame.

2. The frame according to claim 1, wherein
the differential alignment layer includes a normal directional alignment layer having reinforcement fibers aligned in the normal direction.

3. The frame according to claim 2, wherein
the differential alignment layer includes a 45-degree alignment layer having reinforcement fibers aligned in a direction at an angle of 45 degrees to the longitudinal direction.

4. The frame according to claim 1, wherein
the longitudinal alignment layer is out of the corners.

5. The frame according to claim 4, wherein
the longitudinal alignment layer lies in an inner surface section and/or an outer surface section of the compressive wall part.

6. The frame according to claim 1, wherein
the differential alignment layer includes a 45-degree alignment layer having reinforcement fibers aligned in a direction at an angle of 45 degrees to the longitudinal direction.

7. The frame according to claim 1, wherein
the longitudinal alignment layer is out of the corners.

8. The frame according to claim 1, wherein
the longitudinal alignment layer lies in an inner surface section and/or an outer surface section of the compressive wall part.

9. The frame according to claim 1, wherein
the side wall part further includes a longitudinal alignment layer which is located closer to a center of the side wall part in a thickness direction thereof than the differential alignment layer.

10. The frame according to claim 1, which constitutes at least one selected from the group consisting of a center pillar, a bumper beam, a side sill, a hinge pillar, a front pillar, and a crossmember forming a body of a vehicle.

11. A frame which is made of a fiber reinforced composite, has an enclosed cross-section defining a plurality of corners, and has a predetermined length, the frame comprising:
a compressive wall part where a compressive stress occurs in a longitudinal direction of the frame when the frame receives a bending load in a normal direction perpendicularly intersecting the longitudinal direction; and
a side wall part extending in the normal direction and defining one of the corners with the compressive wall part, wherein
the compressive wall part includes a longitudinal alignment layer having reinforcement fibers aligned in the longitudinal direction, and
the side wall part has a surface section composed of a differential alignment layer having reinforcement fibers aligned in a direction different from the longitudinal direction, and wherein
the compressive wall part further includes a normal directional alignment layer having reinforcement fibers aligned in the normal direction, and
the longitudinal alignment layer is located closer to a surface of the compressive wall part than the normal directional alignment layer.

12. The frame according to claim 11, wherein
the differential alignment layer of the side wall part includes a normal directional alignment layer having reinforcement fibers aligned in the normal direction, and
the normal directional alignment layer of the compressive wall part and the normal directional alignment layer of the side wall part are continuous from the compressive wall part to the side wall part.

13. The frame according to claim 12, wherein
the side wall part further includes a longitudinal alignment layer which is located closer to a center of the side wall part in a thickness direction thereof than the differential alignment layer.

14. The frame according to claim 13, which constitutes at least one selected from the group consisting of a center pillar, a bumper beam, a side sill, a hinge pillar, a front pillar, and a crossmember forming a body of a vehicle.

15. The frame according to claim 5, wherein
the side wall part further includes a longitudinal alignment layer which is located closer to a center of the side wall part in a thickness direction thereof than the differential alignment layer.

16. The frame according to claim 15, which constitutes at least one selected from the group consisting of a center pillar, a bumper beam, a side sill, a hinge pillar, a front pillar, and a crossmember forming a body of a vehicle.

* * * * *